(12) United States Patent
    Mase

(10) Patent No.: US 12,687,205 B2
(45) Date of Patent: Jul. 21, 2026

(54) CAM CLUTCH

(71) Applicant: TSUBAKIMOTO CHAIN CO., Osaka (JP)

(72) Inventor: Ryota Mase, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 19/128,642

(22) PCT Filed: Dec. 13, 2023

(86) PCT No.: PCT/JP2023/044651
    § 371 (c)(1),
    (2) Date: May 9, 2025

(87) PCT Pub. No.: WO2024/135499
    PCT Pub. Date: Jun. 27, 2024

(65) Prior Publication Data
    US 2026/0177110 A1     Jun. 25, 2026

(30) Foreign Application Priority Data
    Dec. 21, 2022    (JP) ................................. 2022-204610
    Sep. 27, 2023    (WO) ................. PCT/JP2023/035189

(51) Int. Cl.
    F16D 41/08        (2006.01)
    F16D 41/07        (2006.01)
(52) U.S. Cl.
    CPC ........... F16D 41/084 (2013.01); F16D 41/07 (2013.01)
(58) Field of Classification Search
    CPC ............................... F16D 41/07; F16D 41/084
                (Continued)

(56) References Cited

U.S. PATENT DOCUMENTS 2,910,159 A * 10/1959 Nielsen ................. F16D 41/084
                                                        192/84.8
5,343,992 A * 9/1994 Stark ..................... F16D 41/061
                                                        192/93 C
                (Continued)

FOREIGN PATENT DOCUMENTS

JP        2003-301866 A      10/2003
JP        2012-172787 A       9/2012
                (Continued)

OTHER PUBLICATIONS

International Search Report dated Feb. 27, 2024, issued in counterpart International Application No. PCT/JP2023/044651. (2 pages).
                (Continued)

*Primary Examiner* — Richard M Lorence
(74) *Attorney, Agent, or Firm* — WHDA, LLP

(57)        ABSTRACT

A cam clutch (100) according to the present invention is configured such that cams (180) that are brought into a non-contact state with any one of or both an inner ring (110) and an outer ring (120) in a neutral posture and are configured to be able to be engaged with the inner ring (110) and the outer ring (120) irrespective of the cams leaning in either of a forward or backward direction are held by a fixed cage (130) and a movable cage (150) that is disposed to be relatively rotatable with respect to the fixed cage (130) and movable in an axis direction, one of the fixed cage (130) and the movable cage (150) is provided with guide groove portions (160), and the other one of the fixed cage (130) and the movable cage (150) is provided with pin members (140), and phases of the movable cage (150) and the fixed cage (130) are able to be controlled by causing the pin members (140) to move along the guide groove portions (160).

8 Claims, 22 Drawing Sheets

(58) Field of Classification Search
USPC ........................................................ 192/45.1
See application file for complete search history.

(56)                     References Cited

U.S. PATENT DOCUMENTS 8,307,925 B2 *  11/2012  Tang ...................... B60K 6/387
                                                              192/43.1
9,212,707 B2 *  12/2015  Kato ........................ F16D 41/07
2022/0056963 A1     2/2022  Nakagawa et al.

FOREIGN PATENT DOCUMENTS

JP        2020-190255 A     11/2020
WO        2008/154830 A1    12/2008
WO        2012/026020 A1     3/2012

OTHER PUBLICATIONS

Written Opinion of the International Searching Authority (Form
PCT/ISA/237) dated Feb. 27, 2024, issued in counterpart Interna-
tional Application No. PCT/JP2023/044651. (3 pages).

* cited by examiner (a)                     (b)

CAM CLUTCH

TECHNICAL FIELD

The present invention relates to a cam clutch configured to be able to switch an operation mode among a bidirectional simultaneous idling mode in which an inner ring or an outer ring idles in both forward and backward directions to block torque transmission between the inner ring and the outer ring, a unidirectional transmission mode (one-way mode) in which torque transmission can be achieved in any one of forward and backward directions between the inner ring and the outer ring, and a bidirectional simultaneous transmission mode (two-way mode) in which torque transmission can be achieved in both the forward and backward directions between the inner ring and the outer ring.

BACKGROUND ART

For example, a clutch configured such that cams as engagement elements that are engaged only in one direction of rotation are horizontally symmetrically aligned and operation modes of the clutch can be switched by causing one of or both one of the cams and the other cam to lean is known (see Patent Literature 1, for example).

However, there is a concern that "biting" in which all the cams simultaneously interlock with each other may occur in the aforementioned clutch.

In other words, a first cam and a second cam disposed such that their interlocking directions are opposite directions are biased to be brought into contact with the outer ring and the inner ring, and if a torque works on the outer ring or the inner ring, one of the cams leans to immediately start interlocking with the outer ring and the inner ring in the aforementioned clutch. Although one of the cams leans in an interlocking release direction and is shifted to an idling state by the torque being released, there is a concern that the other cam may lean in an interlocking direction and start interlocking with the outer ring and the inner ring before the interlocking of the one of the cams is released at this time.

Since all the cams interlock with each other with a high surface pressure in such a state, a large force is needed to change the postures of the cams when the operation mode of the clutch is switched, and there is a concern that engagement surfaces of the cams with respect to the outer ring and the inner ring, a raceway surface of the outer ring, and a raceway surface of the inner ring may be damaged and a lifetime of the clutch may be shortened.

Moreover, a two-direction clutch that is capable of switching between driving and idling in both a forward direction and a backward direction and is configured to be able to switch operation modes of the clutch by using a sprag of a so-called two-direction type as an engagement element and causing the sprag to lean in one direction or the other direction is known (see Patent Literature 2, for example).

The two-direction clutch described in Patent Literature 2 includes an outer holding tool that includes an outer long hole extending in the axis direction and an inner holding tool that includes an inner long groove inclined with respect to the axis direction and adapted such that a distal end of a pin inserted into the outer long hole is inserted, and the two-direction clutch is configured such that the sprag is caused to lean in a predetermined direction by causing the pin to move in the axis direction and causing the outer holding tool and the inner holding tool to be relatively displaced in the circumferential direction. The two-direction clutch is adapted such that operation modes are switched between a unidirectional transmission mode in which a torque can be transmitted only in the forward direction between an inner ring and an outer ring and a unidirectional transmission mode in which the torque can be transmitted only in the backward direction between the inner ring and the outer ring, by controlling a moving direction of the pin and switching a leaning direction of the sprag.

CITATION LIST

Patent Literature

Patent Literature 1: Japanese Patent Application Publication No. 2020-190255
Patent Literature 2: Japanese Patent Application Publication No. 2003-301866

SUMMARY OF INVENTION

Technical Problem

Here, biting does not occur in the two-direction clutch using a sprag of a two-direction type when a torque transmission direction is switched.

However, the two-direction clutch described in Patent Literature 2 is adapted such that the sprag is held in the state where the sprag leans in the predetermined direction by the pin being held in a state where the pin is accommodated in a parallel groove provided at each of both ends of the inner long groove and the pin is movable along the inner long groove when the pin is not held in any of the parallel grooves. Therefore, it is not possible to hold the sprag in a neutral posture where the sprag is in a non-contact state with any one of or both the inner ring and the outer ring, and it is not possible to realize a bidirectional simultaneous idling mode.

Moreover, it is not possible to hold the sprag in a state where the sprag is in contact with the inner ring and the outer ring such that the sprag can actively change its posture in accordance with a rotation direction of the inner ring or the outer ring, and it is not possible to realize a bidirectional simultaneous transmission mode.

The present invention was made on the basis of such circumstances, and an object thereof is to provide a cam clutch capable of smoothly switching an operation mode in accordance with a utilization status, preventing occurrence of biting of cams and occurrence of a drag torque at the time of idling, and securing a large torque capacity.

Solution to Problem

The present invention solves the above problem by a configuration of a cam clutch including: an inner ring and an outer ring that are coaxially provided such that the inner ring and the outer ring are relatively rotatable; a fixed cage that includes pocket portions aligned at predetermined intervals in a circumferential direction and is fixed to the inner ring or the outer ring; a movable cage that includes pocket portions aligned at predetermined intervals in the circumferential direction and is disposed to be relatively rotatable with respect to the fixed cage; a plurality of cams that are arranged in the circumferential direction between the inner ring and the outer ring by being held by the fixed cage and the movable cage and are configured to be able to be engaged with the inner ring and the outer ring irrespective of the cams leaning in either of forward or backward directions with respect to a neutral posture in which the cams are not in contact with one of or both the inner ring and the outer ring; and a biasing means for biasing the plurality of cams into the neutral posture or an inclined posture in which the cams are brought into contact with the inner ring and the outer ring, in which the movable cage is axially movably provided, one of the fixed cage and the movable cage is provided with guide groove portions such that the guide grooves extend in an axis direction, the other one of the fixed cage and the movable cage is provided with pin members such that the pin members move along the guide groove portions with movement of the movable cage in the axis direction, and each of the guide groove portions includes a phase regulating portion that is configured to be able to hold the movable cage in a state where the pocket portions of the movable cage are in the same phase as a phase of the pocket portions of the fixed cage, a first phase change allowing portion that is configured to be able to hold the movable cage in a state where the movable cage is movable within a predetermined range in one of the forward and backward directions with respect to the fixed cage, and a second phase change allowing portion that is configured to be able to hold the movable cage in a state where the movable cage is movable within a predetermined range in both the forward and backward directions with respect to the fixed cage.

Advantageous Effects of Invention

According to the invention of claim 1, the guide groove portions provided in one of the movable cage and the fixed cage are configured to include the phase regulating portions, the first phase change allowing portions, and the second phase change allowing portions, and it is thus possible to control a degree of freedom of movement of the movable cage in the circumferential direction with respect to the fixed cage depending on the positions of the pin members provided in the other one of the movable cage and the fixed cage. Therefore, it is possible to switch an operation mode of the cam clutch among a bidirectional simultaneous idling mode, a unidirectional transmission mode, and a bidirectional simultaneous transmission mode. For switching the operation mode, it is possible to control the cam posture and to hold the cam posture merely by causing the movable cage to move in the axis direction, and it is thus possible to smoothly switch the operation mode in accordance with a utilization status and to obtain high versatility.

Also, all the cams exhibit the same behavior by the configuration in which the cams are brought into a state where the cams are not in contact with any one of or both the inner ring and the outer ring in the neutral posture and the cams are engaged with the inner ring and the outer ring irrespective of the cams leaning in either of the forward or backward direction, and no biting occurs. Therefore, there is no need to use a large-sized drive source to cause the movable cage to move in the axis direction, and it is possible to achieve energy saving and size reduction. Furthermore, since it is possible to achieve the state where all the cams are not in contact with the outer ring or the inner ring at the time of idling and to reduce a torque at the time of idling, there is no concern that engagement surfaces of the cams, a raceway surface of the outer ring, and a raceway surface of the inner ring are damaged, and it is possible to elongate a lifetime and to reduce noise. Furthermore, since the individual cams can transmit a torque in both the forward and backward directions, it is possible to increase the number of cams which are mounted and to increase a torque capacity.

According to the invention of claim 2, each of the guide groove portions is formed such that a first phase change allowing portion is located between a phase regulating portion and a second phase change allowing portion, a degree of freedom in movement of the movable cage in the circumferential direction with respect to the fixed cage is thus controlled in a stepwise manner, and it is thus possible to smoothly switch the operation mode.

According to the invention of claim 3 and the invention of claim 4, it is possible to realize two unidirectional transmission modes, namely a unidirectional transmission mode in which a torque can be transmitted in the forward direction and a unidirectional transmission mode in which the torque can be transmitted in the backward direction, it is possible to switch four operation modes including bidirectional simultaneous idling mode and a bidirectional simultaneous transmission mode, and it is thus possible to cause the cam clutch to have higher versatility.

According to the invention of claim 5, the movable cage includes a phase synchronization means for causing the movable cage to rotate in synchronization with the inner ring or the outer ring, and it is thus possible to cause the cams to actively lean in accordance with a rotation direction of the inner ring or the outer ring and to thereby reliably realize the bidirectional simultaneous transmission mode in which a torque can be transmitted in both the forward and backward directions.

Furthermore, according to the invention of claim 6 and the invention of claim 7, it is possible to cause the movable cage to rotate in synchronization with the inner ring or the outer ring with a simple structure without needing a complicated structure by the phase synchronization means being configured of a magnet or by the phase synchronization means being configured of a tapered portion that is provided in the movable cage and can be brought into contact engagement with the inner ring or the outer ring with movement in the axis direction. In particular, according to the invention of claim 7, since it is possible to mechanically integrally bond the movable cage to the inner ring or the outer ring, it is possible to avoid occurrence of slipping of bonded surfaces between the movable cage and the inner ring or the outer ring due to a change in postures of the cams and to avoid instability of the operation mode due to adsorption of wear debris, for example.

According to the invention of claim 8, it is possible to improve followability of a leaning operation in the cam interlocking direction accompanying rotation of the inner ring or the outer ring when the operation mode is changed to the unidirectional transmission mode.

DESCRIPTION OF EMBODIMENTS

First Embodiment

Figure 1:
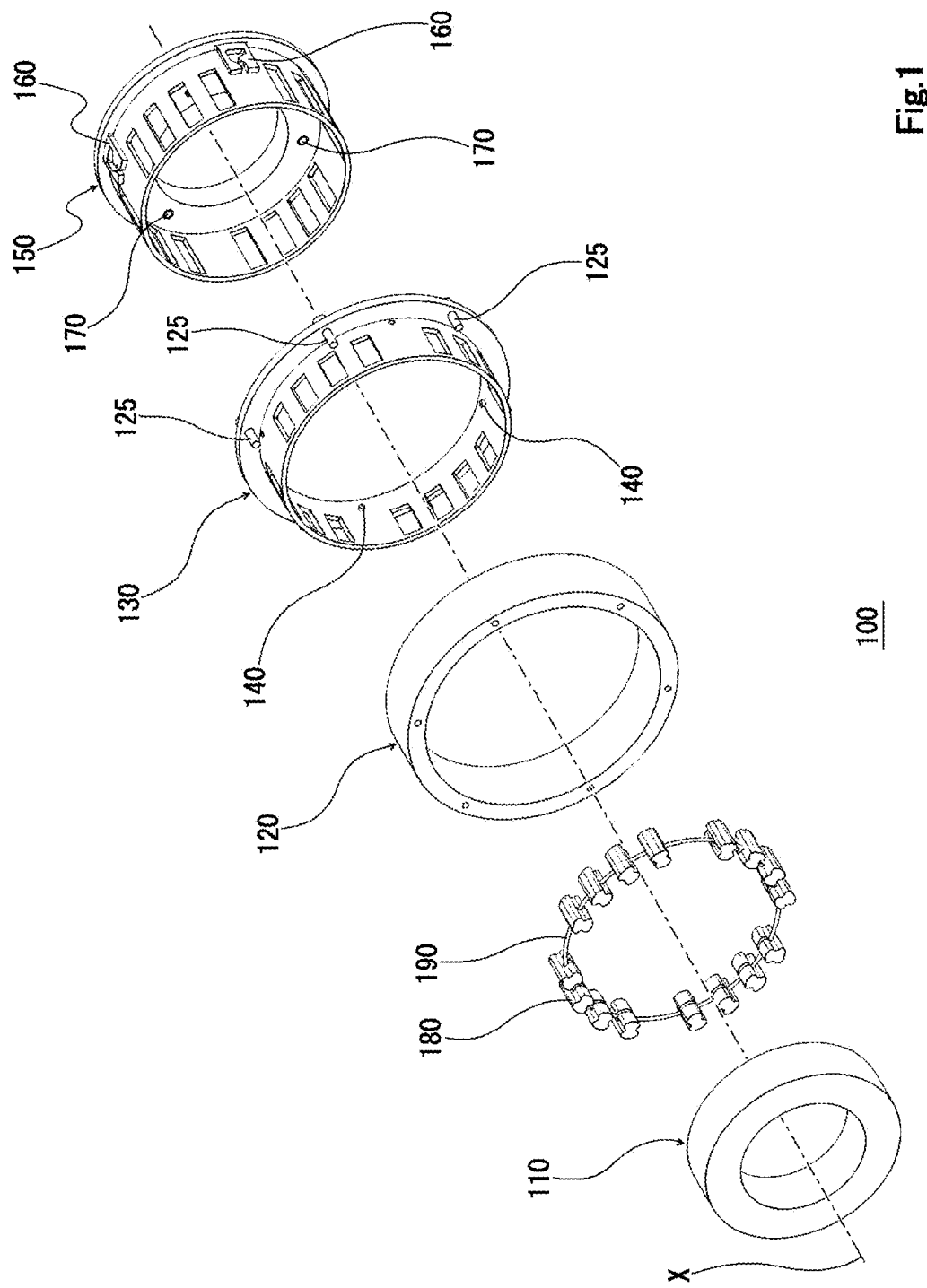
FIG. 1 is an exploded perspective view illustrating a configuration example of a cam clutch according to a first embodiment of the present invention.
Figure 2:
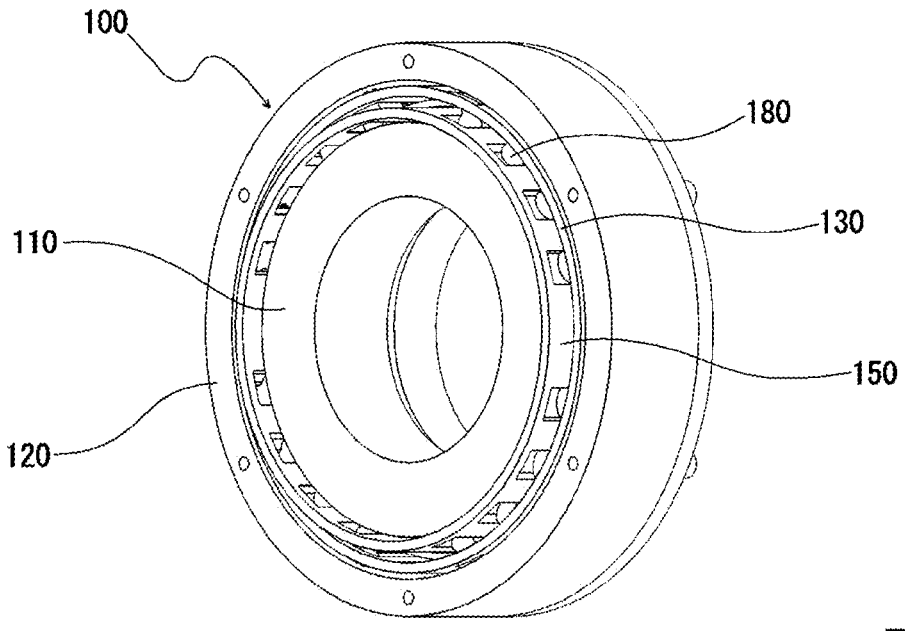
FIG. 2 is a perspective view of the cam clutch illustrated in FIG. 1 when seen from a front side.
Figure 3:
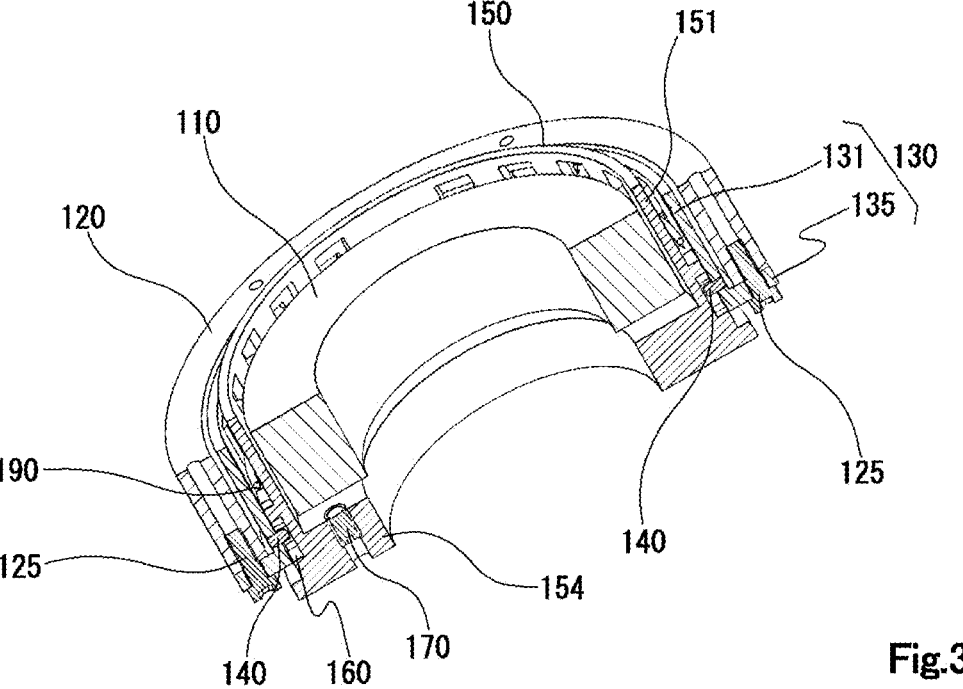
FIG. 3 is a sectional perspective view of the cam clutch illustrated in FIG. 1 when taken along a plane including a rotation axis center.
Figures 4, 5:
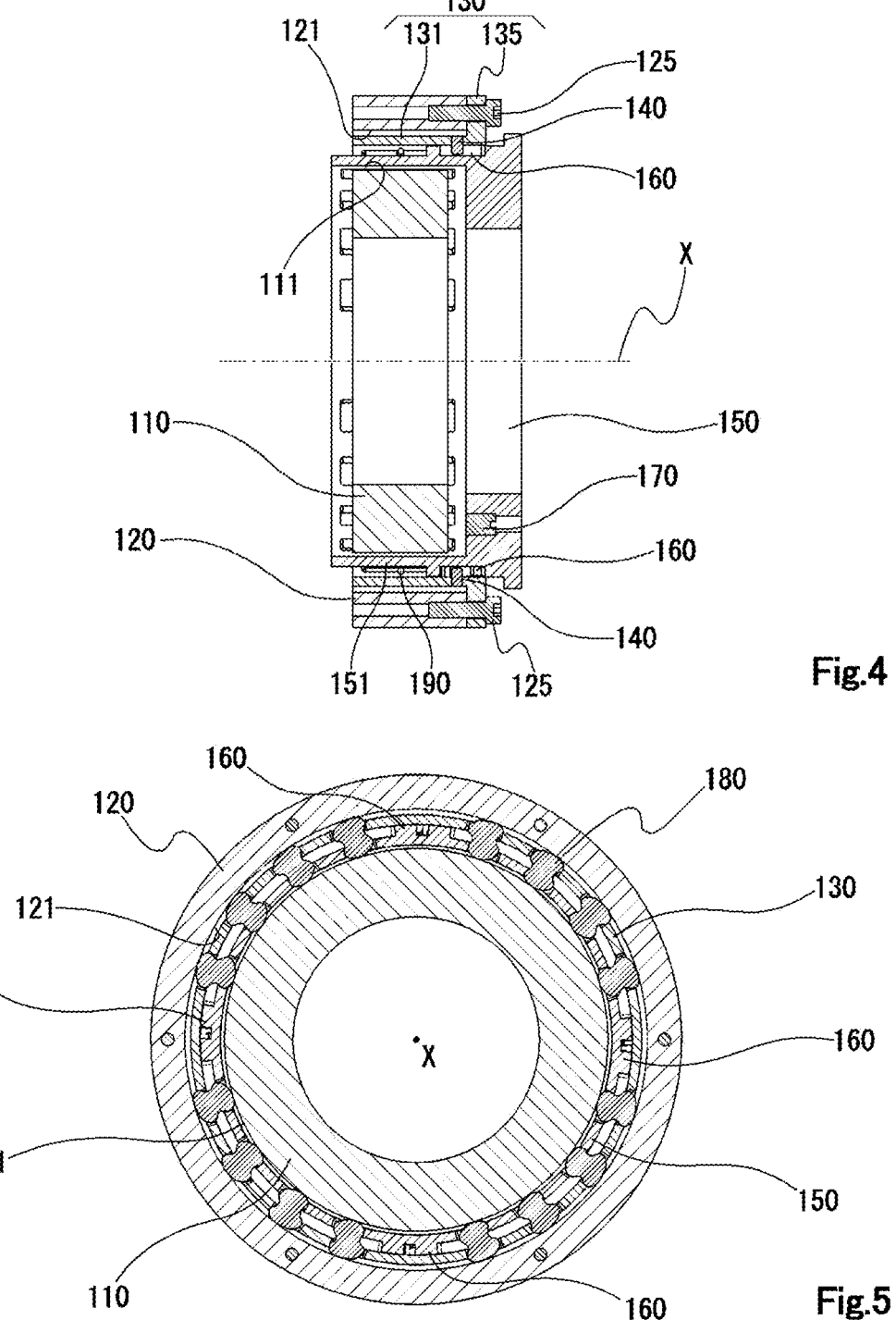
FIG. 4 is an axis direction sectional view of the cam clutch illustrated in FIG. 1 when taken along a plane including the rotation axis center.
FIG. 5 is a radial direction sectional view of the cam clutch illustrated in FIG. 1 when taken along a plane perpendicularly intersecting the rotation axis center.

As illustrated in FIG. 1, a cam clutch 100 according to the present invention includes an inner ring 110, an outer ring 120, a fixed cage 130, a movable cage 150, cams 180 as engagement elements, and a biasing means 190.

As illustrated in FIGS. 2 to 5, the inner ring 110 and the outer ring 120 are relatively rotatably provided on the same rotation axis X and are disposed such that a raceway surface 111 of the inner ring 110 and a raceway surface 121 of the outer ring 120 face each other in a state where the cam clutch 100 is assembled. In the present embodiment, the inner ring 110 is configured as a rotation ring on an input side, and the outer ring 120 is configured as a rotation ring on an output side, for example.

Figure 6:
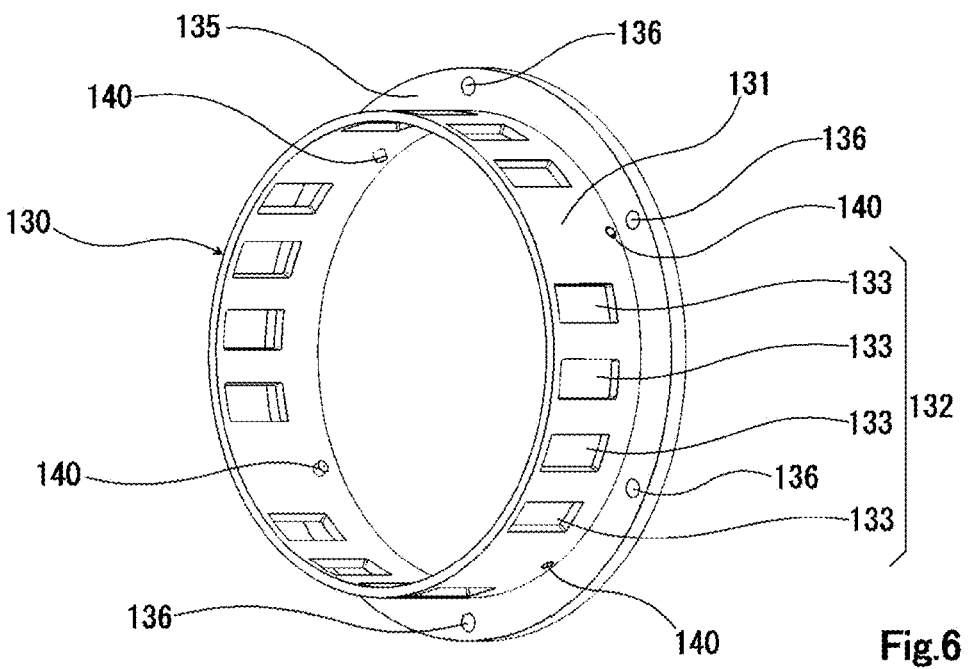
FIG. 6 is a perspective view illustrating a configuration of a fixed cage when seen from the front side.

As illustrated in FIG. 6, the fixed cage 130 includes a cylindrical shaft portion 131 extending along a rotation axis center and an outer flange portion 135 extending to project outward in the radial direction over the entire periphery in the circumferential direction at one end of the shaft portion 131.

A plurality of pocket portions 133 are formed in the shaft portion 131 such that the pocket portions 133 are aligned at predetermined intervals in the circumferential direction.

In the present embodiment, a plurality of pocket portion groups 132 are arranged to be aligned at equal intervals in the circumferential direction with four pocket portions 133 aligned at equal intervals in the circumferential direction regarded as forming one pocket portion group 132. Each pocket portion 133 is formed such that an opening shape is a rectangular shape.

The outer flange portion 135 is formed to face one end surface of the outer ring 120, and a plurality of screw attachment holes 136 penetrating in the thickness direction are formed to be aligned at predetermined intervals in the circumferential direction.

As illustrated in FIGS. 2 to 5, the fixed cage 130 is inserted into and disposed in an annular space between the inner ring 110 and the outer ring 120 such that the shaft portion 131 is located coaxially with the inner ring 110 and the outer ring 120 with a clearance left from the raceway surface 121 of the outer ring 120, and is fixed to the outer ring 120 as the rotation ring on the output side with fixing screws 125 attached from the outward side in the axis direction.

Figure 7:
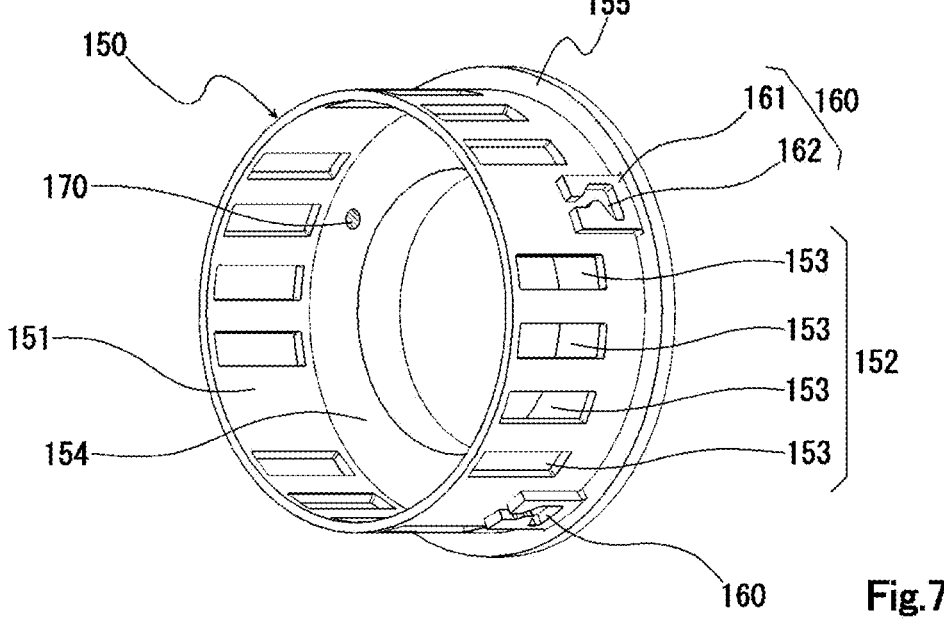
FIG. 7 is a perspective view illustrating a configuration of a movable cage when seen from the front side.

As illustrated in FIG. 7 as well, the movable cage 150 includes a cylindrical shaft portion 151 extending along the rotation axis center, an annular plate-shaped end wall portion 154 formed to face one end surface of the inner ring 110 at one end of the shaft portion 151, and an outer flange portion 155 extending to project outward in the radial direction over the entire periphery in the circumferential direction at one end of the shaft portion 151.

A plurality of pocket portions 153 corresponding to the pocket portions 133 of the fixed cage 130, respectively, are formed in the shaft portion 151 such that the pocket portions 133 are aligned at predetermined intervals in the circumferential direction.

In the present embodiment, a plurality of pocket portion groups 152 are arranged to be aligned at equal intervals in the circumferential direction with four pocket portions 153 aligned at equal intervals in the circumferential direction regarded as forming one pocket portion group 152. Each pocket portion 153 is formed such that an opening shape is a rectangular shape.

The outer flange portion 155 is formed to be able to regulate movement of the movable cage 150 on the front side in the axis direction by being locked at one end surface of the fixed cage 130.

As illustrated in FIGS. 2 to 5, the movable cage 150 is inserted into an annular space between the inner ring 110 and the outer ring 120 such that the shaft portion 151 is located coaxially with the inner ring 110 and the outer ring 120 with a clearance left from the raceway surface 111 of the inner ring 110 on the inner side of the fixed cage 130, and is disposed to be relatively rotatable with respect to the fixed cage 130 and movable in the axis direction.

The cams 180 are configured to be able to be engaged with the inner ring 110 and the outer ring 120 irrespective of the cams 180 leaning in either of the forward or backward direction. Hereinafter, the clockwise direction in FIG. 5 will be referred to as a "forward direction", and the counterclockwise direction will be referred to as a "backward direction" for convenience.

Figures 8, 9A, 9B:
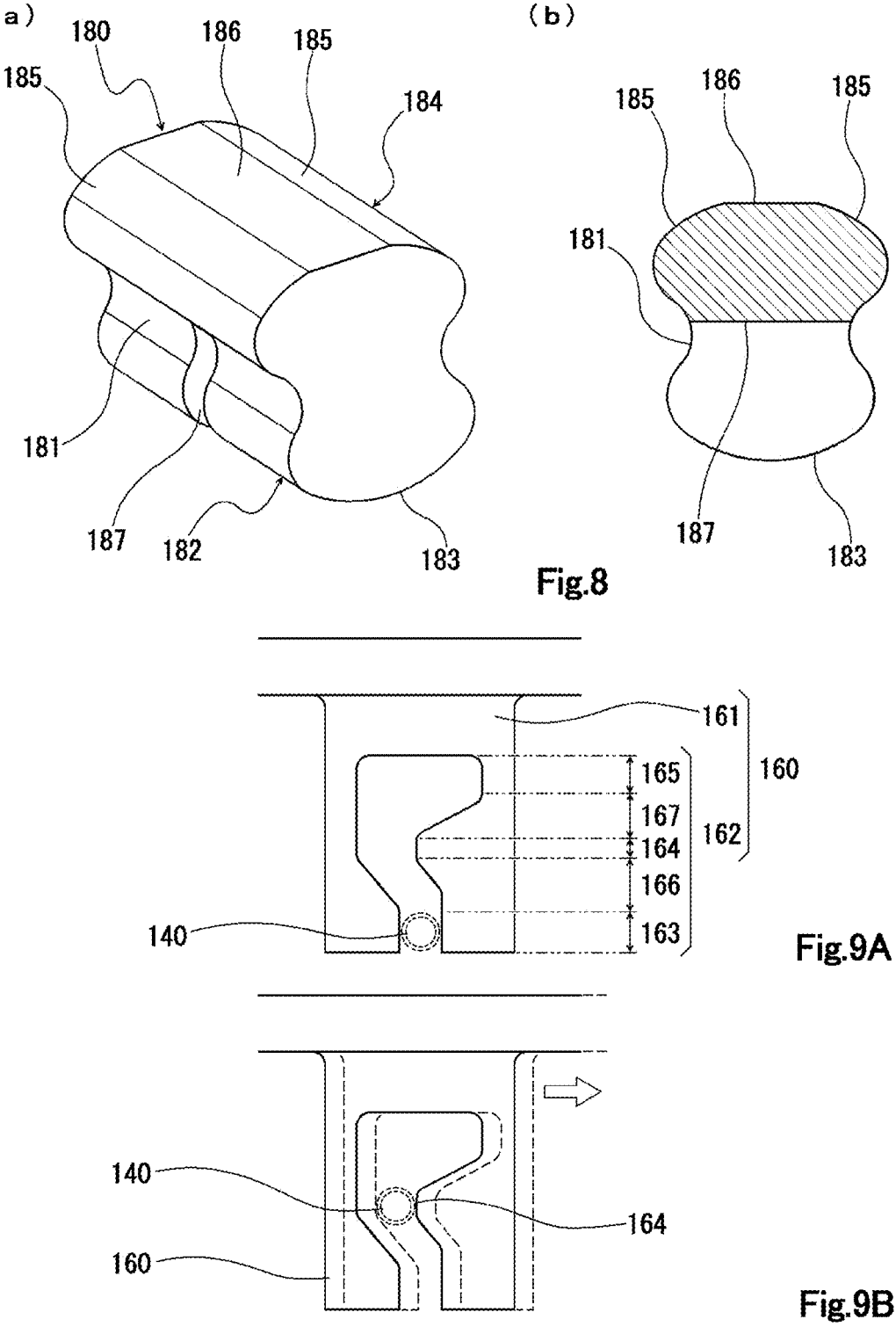
FIG. 8 is (a) a perspective view and (b) a sectional view illustrating a configuration of a cam.
FIG. 9A is a diagram schematically illustrating a configuration of a guide groove portion in the movable cage illustrated in FIG. 7.
FIG. 9B is a diagram schematically illustrating a state where a pin member is located in a first phase change allowing portion.

Each cam 180 according to the present embodiment includes a narrowed portion 181 at a center in the radial direction in a plan view and is configured to have a horizontally symmetrical shape, for example, to form a substantially gourd shape as illustrated in FIG. 8.

A leg part 182 on the side closer to the inner ring than the narrowed portion 181 includes an arc-shaped inner ring-side engagement surface 183, and both side surfaces that smoothly continue to the inner ring-side engagement surface 183 and are in contact with the movable cage 150 are formed as curved surfaces along the arc.

Furthermore, a head part 184 on the side closer to the outer ring than the narrowed portion 181 includes a flat surface 186 and an outer ring-side engagement surface 185 that continues to each of both sides of the flat surface 186, and both side surfaces that smoothly continue to the outer ring-side engagement surface 185 and are in contact with the fixed cage 130 are formed as curved surfaces along the arc.

In the present embodiment, an annular garter spring, for example, is used as the biasing means 190, and garter spring attachment grooves 187 extending in the circumferential direction are formed in the inner ring-side engagement surfaces 183 of the cams 180.

The garter spring attachment groove 187 is formed such that a bottom surface extends parallel to the flat surface 186, and is configured such that the cams 180 are biased toward the outer ring 120 by the garter spring being attached in a compressed state. In this manner, the cams 180 are brought into a state where the cams 180 are not in contact with the inner ring 110, for example, in a neutral posture.

The cams 180 are held such that the postures can be changed by the fixed cage 130 and the movable cage 150 by the leg parts 182 being inserted into the pocket portions 153 of the movable cage 150 and by the head parts 184 being inserted into the pocket portions 133 of the fixed cage 130, and are disposed at predetermined intervals in the circumferential direction between the inner ring 110 and the outer ring 120.

Thus, guide groove portions 160 extending in the axis direction are provided in the movable cage 150, and pin members 140 caused to move along the guide groove portions 160 by movement of the movable cage 150 in the axis direction are provided in the fixed cage 130, in the cam clutch 100. It is thus possible to control a phase of the pocket portions 153 of the movable cage 150 with respect to the pocket portions 133 of the fixed cage 130 and to switch an operation mode of the cam clutch 100.

As illustrated in FIG. 7, the guide groove portions 160 are provided at equal intervals in the circumferential direction in one end-side regions between adjacent pocket portion groups 152 in the outer surface of the shaft portion 151 of the movable cage 150. In the present embodiment, since the pocket portion groups 152 are disposed at equal intervals in the circumferential direction, the guide groove portions 160 are also disposed at equal intervals in the circumferential direction, and it is thus possible to stably guide the movement of the movable cage 150 in the axis direction and to smoothly switch the operation mode of the cam clutch 100.

The guide groove portions 160 are configured by forming guide grooves 162 extending in the axis direction in outer surfaces of mounting portions 161 provided to project from the outer surface of the shaft portion 151 of the movable cage 150.

As illustrated in FIG. 9A, each of the guide grooves 162 includes a phase regulating portion 163, a first phase change allowing portion 164, and a second phase change allowing portion 165.

Each phase regulating portion 163 is formed to linearly extend in the axis direction with a groove width equivalent to the outer diameter of each pin member 140 and is configured to be able to hold the movable cage 150 such that the pocket portions 153 of the movable cage 150 are in the same phase as that of the pocket portions 133 of the fixed cage 130.

Therefore, relative rotation of the movable cage 150 with respect to the fixed cage 130 in both the forward and backward directions is inhibited, and the cams 180 are held in the neutral posture when the pin members 140 are located in the phase regulating portions 163. In this manner, the operation mode of the cam clutch 100 is held in a bidirectional simultaneous idling mode.

Each first phase change allowing portion 164 continues to the phase regulating portion 163 via a first continuously provided portion 166 extending to be inclined in the backward direction toward one end side in the axis direction. The first phase change allowing portion 164 is formed to extend in the axis direction with a groove width that is greater than the outer diameter of each pin member 140 and is configured to be able to hold the movable cage 150 in a state where the movable cage 150 is movable within a predetermined range in the forward direction with respect to the fixed cage 130.

Therefore, when the pin members 140 are located in the first phase change allowing portions 164, the cams 180 are caused to lean, and a change in phase of the pocket portions 153 in the movable cage 150 with respect to the pocket portions 133 in the fixed cage 130 due to relative rotation of the movable cage 150 with respect to the fixed cage 130 is allowed as illustrated by the dashed line in FIG. 9B, by the movable cage 150 being caused to relatively move in the forward direction with respect to the fixed cage 130. In this manner, the cams 180 are held in an interlocking standby state in order for interlocking with respect to the inner ring 110 and the outer ring 120 to be immediately started, and the operation mode of the cam clutch 100 is held in a unidirectional transmission mode in which the cam 180 can transmit a torque in the forward direction, by the inner ring 110 being caused to rotate in the forward direction, for example.

Each second phase change allowing portion 165 continues to each first phase change allowing portion 164 via a second continuously provided portion 167 configured to have a wider groove width toward one end side in the axis direction. The second phase change allowing portion 165 is formed to extend in the circumferential direction and is configured to be able to hold the movable cage 150 in a state where the movable cage 150 is movable within a predetermined range in both the forward and backward directions with respect to the fixed cage 130.

Figure 9C:
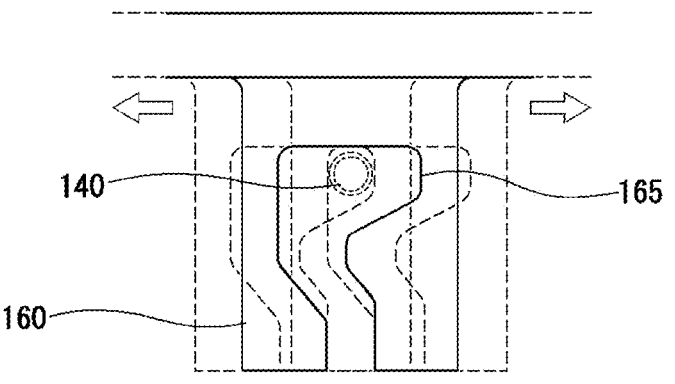
FIG. 9C is a diagram schematically illustrating a state where the pin member is located in a second phase change allowing portion.

Therefore, when the pin members 140 are located in the second phase change allowing portions 165, a change in phase of the pocket portions 153 in the movable cage 150 with respect to the pocket portions 133 in the fixed cage 130 in both the forward and backward directions due to relative rotation of the movable cage 150 with respect to the fixed cage 130 is allowed as illustrated by the dashed line in FIG. 9C. In this manner, irrespective of the inner ring 110 being caused to rotate in either of the forward or backward direction, the cams 180 are held in the interlocking standby state in order for interlocking with respect to the inner ring 110 and the outer ring 120 to be started, and the operation mode of the cam clutch 100 is held in the bidirectional simultaneous transmission mode in which the cams 180 can transmit a torque in either of the forward or backward direction.

Since a degree of freedom in movement of the movable cage 150 in the circumferential direction with respect to the fixed cage 130 is controlled in a stepwise manner by the guide groove portions 160 being formed such that each first phase change allowing portion 164 is located between the phase regulating portion 163 and the second phase change allowing portion 165, it is possible to smoothly switch the operation mode.

The pin members 140 are provided to project inward in the radial direction such that distal end portions are inserted into the guide groove portions 160 in one end-side region between adjacent pocket portion groups 132 in the inner surface of the shaft portion 131 of the fixed cage 130.

Moreover, the movable cage 150 includes a phase synchronization means 170 for causing the movable cage 150 to rotate in synchronization with the inner ring 110 when the movable cage 150 is caused to move in the axis direction such that the pin members 140 are located in the second phase change allowing portions 165 in the aforementioned cam clutch 100.

In the present embodiment, each phase synchronization means 170 is configured of a magnet, for example, and is adapted to cause the movable cage 150 to be magnetically integrally bonded to the inner ring 110 and causes the movable cage 150 to synchronously rotate in accordance with the rotation direction of the inner ring 110. In the cam clutch 100 according to the present embodiment, three columnar magnets are buried at positions separated from each other at equal intervals in the circumferential direction in a state where one end surfaces thereof are exposed from an end wall portion 154 of the movable cage 150.

Hereinafter, operations of the aforementioned cam clutch 100 will be described.

Figure 10A:
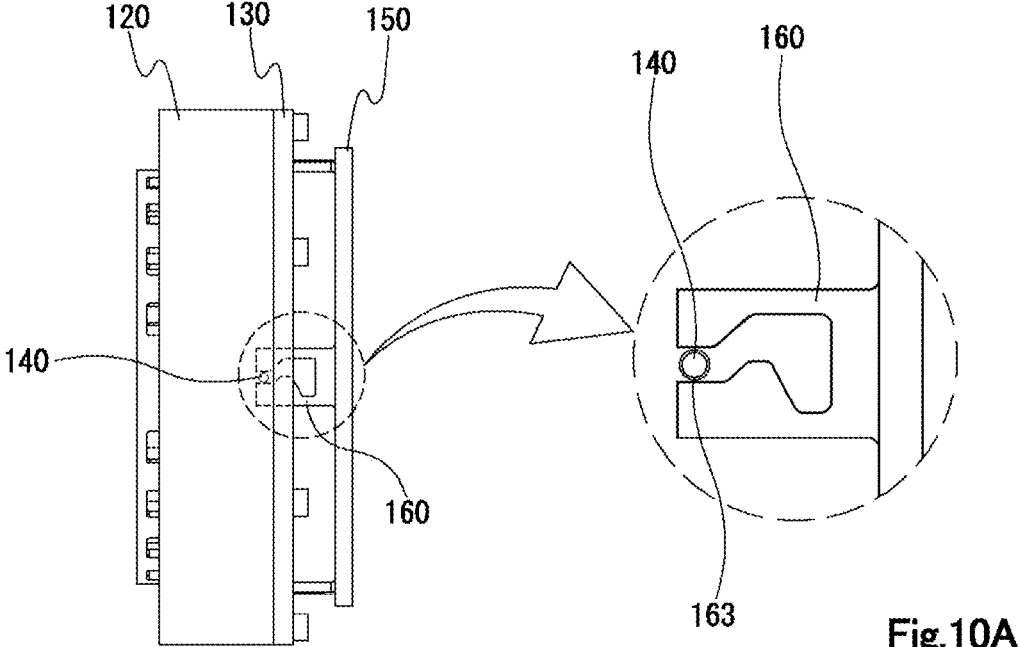
FIG. 10A is a side view illustrating a state of the cam clutch illustrated in FIG. 1 when an operation mode of the cam clutch is a bidirectional simultaneous idling mode.
Figures 10B, 11A:
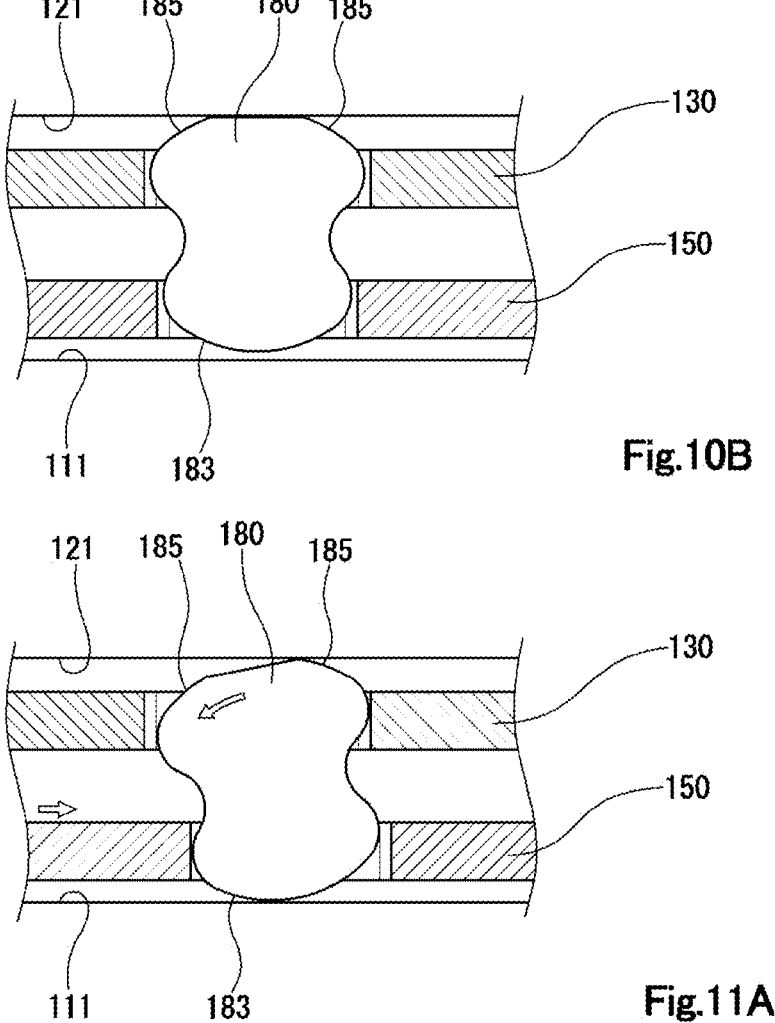
FIG. 10B is a schematic diagram schematically illustrating a state of the cam when the operation mode of the cam clutch illustrated in FIG. 1 is the bidirectional simultaneous idling mode.
FIG. 11A is a schematic diagram schematically illustrating a state of the cam when the operation mode of the cam clutch illustrated in FIG. 1 is shifted from the bidirectional simultaneous idling mode to a unidirectional transmission mode.

First, when the movable cage 150 is fixed at a position in the axis direction where the pin members 140 are located in the phase regulating portions 163 in the guide groove portions 160 with respect to the fixed cage 130 as illustrated in FIG. 10A, relative movement of the movable cage 150 in both the forward and backward directions with respect to the fixed cage 130 is inhibited, and the pocket portions 153 in the movable cage 150 and the pocket portions 133 in the fixed cage 130 are held in the same phase. In this state, all the cams 180 are maintained in a state where the inner ring-side engagement surfaces 183 are separated from the raceway surface 111 of the inner ring 110 as illustrated in FIG. 10B. Therefore, an operation mode of the cam clutch 100 is set to a bidirectional simultaneous idling mode in which torque transmission is blocked between the inner ring 110 and the outer ring 120, and the inner ring 110 idles irrespective of the inner ring 110 being caused to rotate in either of the forward or backward direction.

Once the movable cage 150 is caused to move in the axis direction, the pin members 140 are caused to move along the first continuously provided portions 166, and the movable cage 150 is thereby caused to relatively move in the forward direction with respect to the fixed cage 130. In this manner, the leg parts 182 of the cams 180 are pressurized by the movable cage 150, and the cams 180 are caused to lean in an interlocking direction toward the forward direction as illustrated in FIG. 11A.

Figures 11B, 12A:
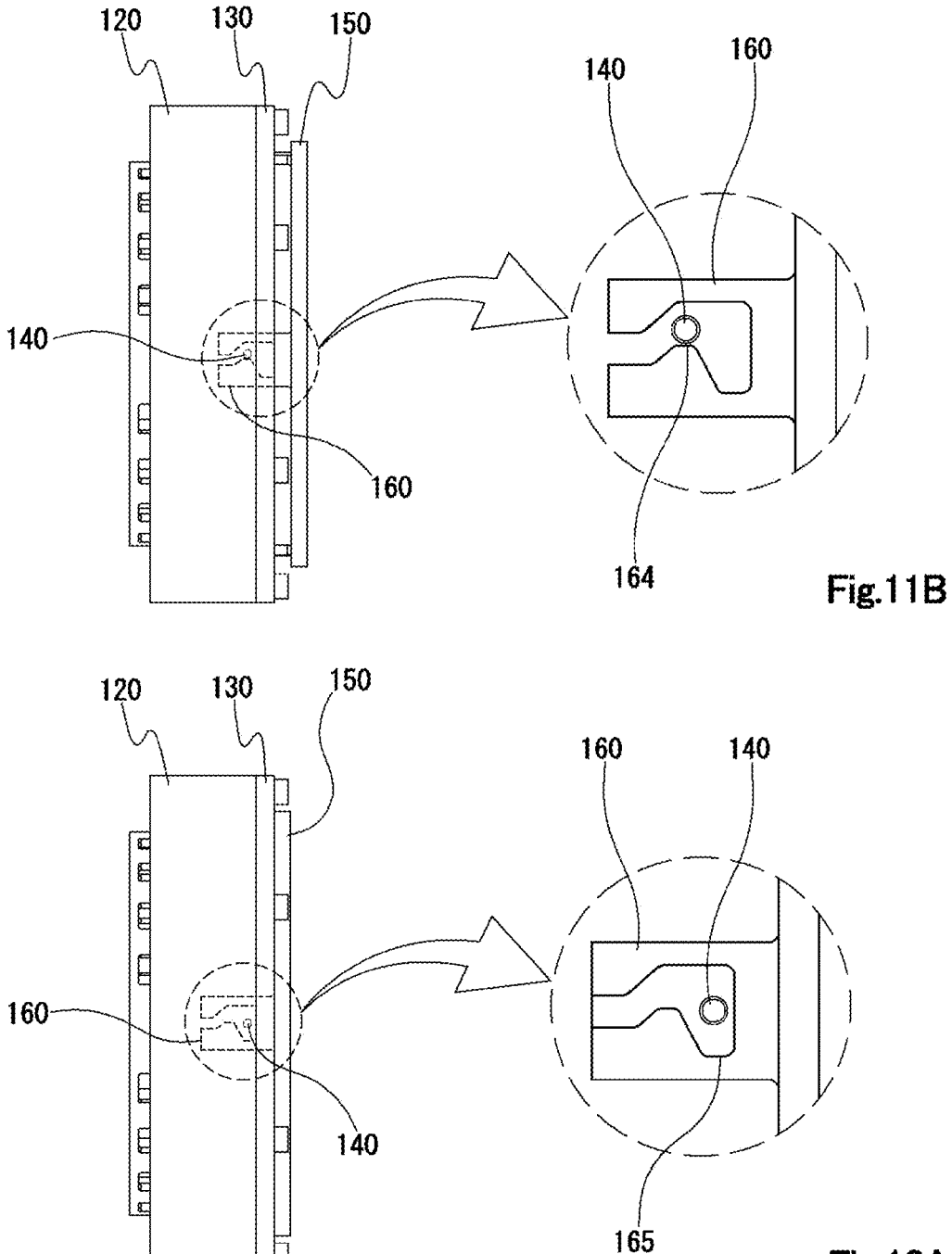
FIG. 11B is a side view illustrating a state of the cam clutch illustrated in FIG. 1 when the operation mode of the cam clutch is the unidirectional transmission mode.
FIG. 12A is a side view illustrating a state of the cam clutch illustrated in FIG. 1 when the operation mode of the cam clutch is a bidirectional simultaneous transmission mode.

Once the movable cage 150 is fixed at a position in the axis direction with respect to the fixed cage 130 where the pin members 140 are located in the first phase change allowing portion 164 in the guide groove portions 160 as illustrated in FIG. 11B, a state where a change in phase of the pocket portions 153 in the movable cage 150 in the forward direction with respect to the pocket portions 133 in the fixed cage 130 is allowed is held. In this manner, the cams 180 are held in the interlocking standby state where the cams 180 immediately starts interlocking with respect to the inner ring 110 and the outer ring 120 due to rotation of the inner ring 110 in the forward direction, and the operation mode of the cam clutch 100 is switched to the unidirectional transmission mode in which a torque is transmitted in the forward direction.

Figures 12B, 12C:
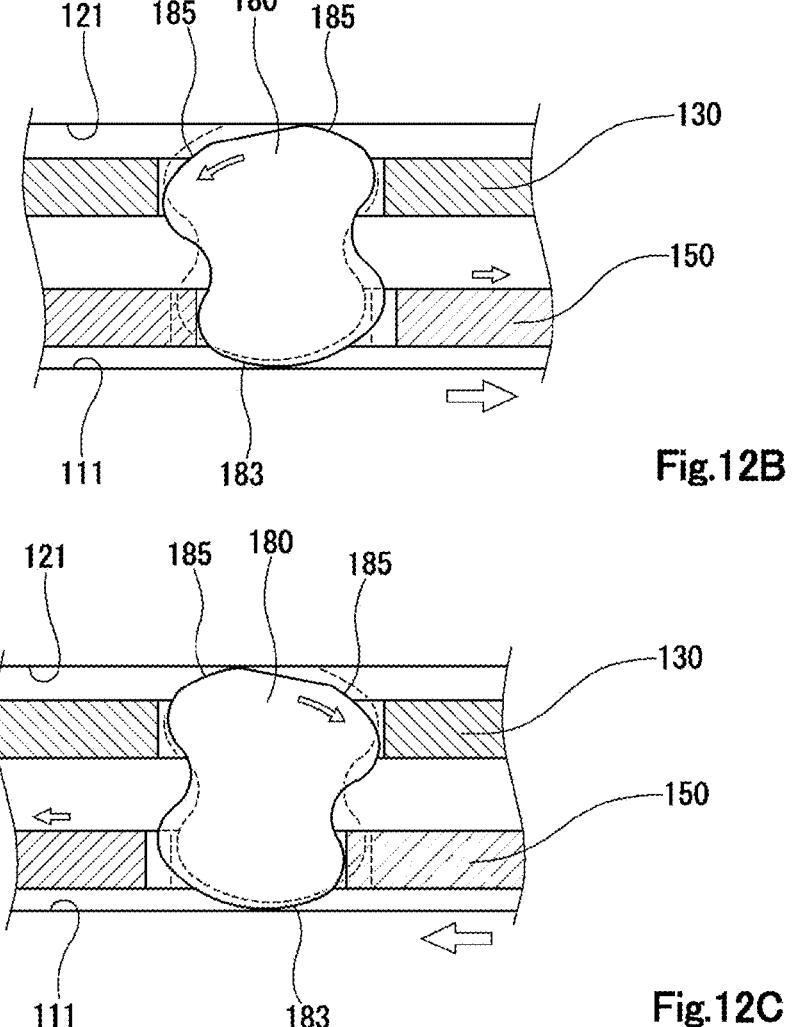
FIG. 12B is a schematic diagram schematically illustrating a behavior of the cam when the operation mode of the cam clutch illustrated in FIG. 1 is the bidirectional simultaneous transmission mode.
FIG. 12C is a schematic diagram schematically illustrating a behavior of the cam when the operation mode of the cam clutch illustrated in FIG. 1 is the bidirectional simultaneous transmission mode.

Also, once the movable cage 150 is caused to move in the axis direction, and the movable cage 150 is fixed at a position in the axis direction with respect to the fixed cage 130 where the pin members 140 are located in the second phase change allowing portions 165 in the guide groove portions 160 as illustrated in FIG. 12A, a state where relative movement of the movable cage 150 in both the forward and backward directions with respect to the fixed cage 130 is allowed is held. At this time, the movable cage 150 and the inner ring 110 are magnetically integrally bonded by the phase synchronization means 170 in the movable cage 150. In this state, once the inner ring 110 rotates in the forward direction, the movable cage 150 rotates integrally with the inner ring 110 and pressurizes the leg parts 182 of the cams 180 as illustrated in FIG. 12B. In this manner, the cams 180 lean in the interlocking direction toward the forward direction and are engaged with the inner ring 110 and the outer ring 120, and torque transmission in the forward direction is performed. On the other hand, once the inner ring 110 rotates in the backward direction, the movable cage 150 rotates integrally with the inner ring 110 and pressurizes the leg parts 182 of the cams 180 as illustrated in FIG. 12C. In this manner, the cams 180 lean in the interlocking direction toward the backward direction and are engaged with the inner ring 110 and the outer ring 120, and torque transmission in the backward direction is performed. In this manner, it is possible to cause the cams 180 to actively lean in accordance with the rotation direction of the inner ring 110 as a rotation ring on the input side by the pin members 140 being brought into a state where the pin members 140 are located in the second phase change allowing portions 165 in the guide groove portions 160, and the operation mode of the cam clutch 100 is switched to the bidirectional simultaneous transmission mode in which a torque can be transmitted in both the forward and backward directions.

Thus, according to the aforementioned cam clutch 100, it is possible to control a degree of freedom in movement of the movable cage 150 in the circumferential direction with respect to the fixed cage 130 by the positions of the pin members 140 provided in the fixed cage 130 by configuring the guide groove portions 160 provided in the movable cage 150 to include the phase regulating portions 163, the first phase change allowing portions 164, and the second phase change allowing portions 165. Therefore, it is possible to switch the operation mode of the cam clutch 100 among the bidirectional simultaneous idling mode, the unidirectional transmission mode, and the bidirectional simultaneous transmission mode. It is possible to control the posture of the cams 180 and to hold the posture of the cams 180 merely by causing the movable cage 150 to move in the axis direction, thereby to smoothly switch the operation mode in accordance with a utilization status, and to obtain high versatility when the operation mode is switched.

Moreover, all the cams 180 show the same behavior by the cams 180 being configured to be brought into a state where the cams 180 are not in contact with the inner ring 110 in the neutral posture and be engaged with the inner ring 110 and the outer ring 120 irrespective of the cams 180 leaning in either of the forward or backward direction, and no biting occurs. Therefore, there is no need to a large-sized drive source to cause the movable cage 150 to move in the axis direction, and it is possible to achieve energy saving and size reduction.

Also, since all the cams 180 are brought into a state where the cams 180 are not in contact with the inner ring 110 or the outer ring 120 at the time of idling and a torque at the time of idling can be reduced in the bidirectional simultaneous idling mode, there is no concern that the inner ring-side engagement surfaces 183 and the outer ring-side engagement surfaces 185 of the cams 180, the raceway surface 111 of the inner ring 110, and the raceway surface 121 of the outer ring 120 are damaged, and it is possible to elongate a lifetime and to reduce noise.

Moreover, since the individual cams 180 are configured to be able to transmit a torque in both the forward and backward directions, it is possible to increase the number of cams 180 to be mounted and to increase a torque capacity.

Although the cam clutch configured to be able to switch the operation mode among the three operation modes, namely the bidirectional simultaneous idling mode, the unidirectional transmission mode, and the bidirectional simultaneous transmission mode has been described hitherto, the cam clutch according to the present invention can also be configured to be able to switch the operation modes among four operation modes including two unidirectional transmission modes, namely a unidirectional transmission mode in which a torque can be transmitted in the forward direction and a unidirectional transmission mode in which the torque can be transmitted in the backward direction.

Figure 13:
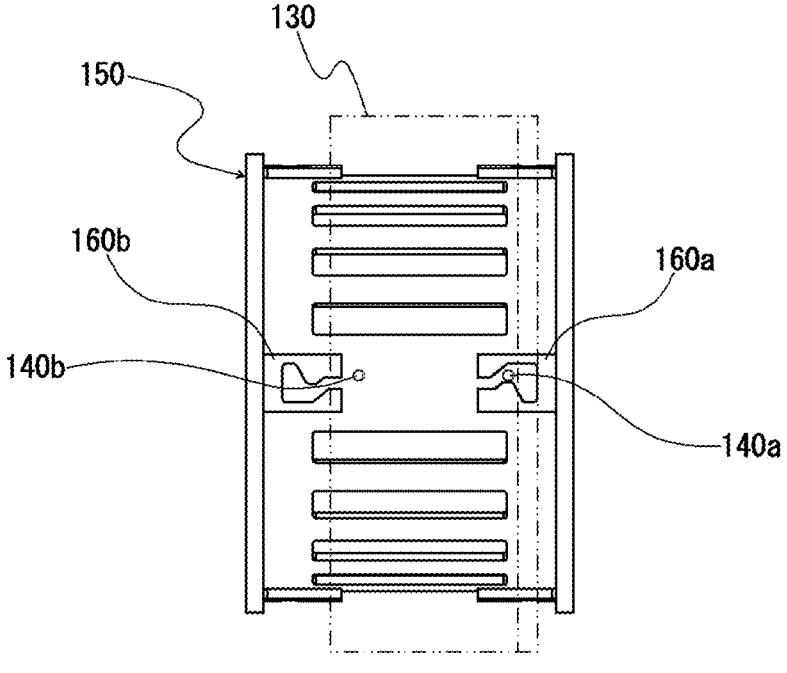
FIG. 13 is a plan view illustrating another configuration example of the movable cage.

The cam clutch that is compatible with the four modes can be realized by using a movable cage 150 configured such that the guide groove portions are provided in a one end-side region and the other end-side region in an outer surface of the shaft portion 151, the first phase change allowing portion 164 in one guide groove portion 160a and the first phase change allowing portion 164 in the other guide groove portion 160b hold the movable cage 150 in a state where the movable cage 150 is movable within a predetermined range in mutually different directions with respect to the fixed cage 130 as illustrated in FIG. 13. In a case where such a movable cage 150 is used, the fixed cage (illustrated by the two-dotted chain line in FIG. 13) 130 is configured such that a first pin member 140a and a second pin member 140b are provided in each of a one end-side region and the other end-side region in the inner surface of the shaft portion 131.

Figure 14:
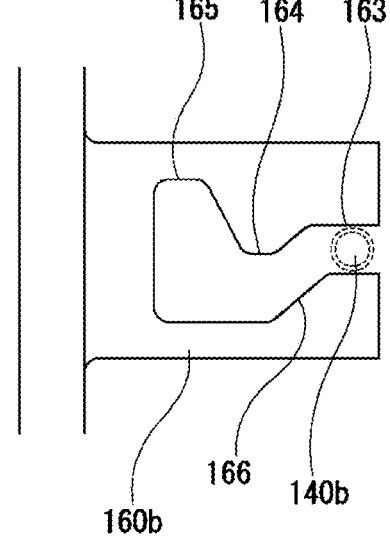
FIG. 14 is a diagram schematically illustrating a configuration of the guide groove portion in the movable cage illustrated in FIG. 13.
Figure 14:
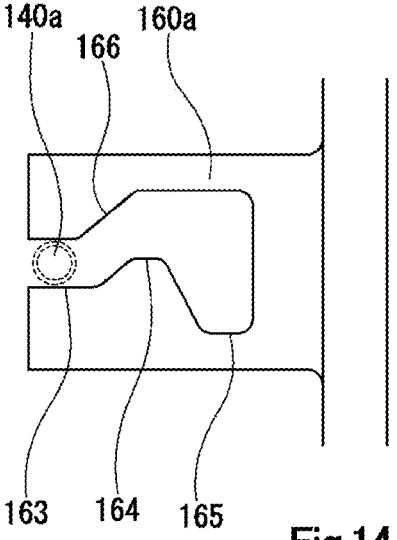

In the cam clutch including such a movable cage 150, the first pin member 140a and the second pin member 140b are brought into a state where the first pin member 140a and the second pin member 140b are located in the phase regulating portion 163 in the one guide groove portion 160a and the phase regulating portion 163 in the other guide groove portion 160b as illustrated in FIG. 14 when the operation mode is the bidirectional simultaneous idling mode.

When the movable cage 150 is caused to move toward the other end side in the axis direction (the left side in FIG. 14), the movable cage 150 is caused to relatively move in the forward direction with respect to the fixed cage 130 by the first pin member 140a being caused to move along the first continuously provided portion 166 in the one guide groove portion 160a, and the cams 180 are thus caused to lean. Once the movable cage 150 is fixed at a position in the axis direction where the first pin member 140a is located in the first phase change allowing portion 164 in the one guide groove portion 160a with respect to the fixed cage 130, a state where a change in phase of the pocket portions 153 in the movable cage 150 in the forward direction with respect to the pocket portions 133 in the fixed cage 130 is allowed is held. In this manner, the operation mode of the cam clutch 100 is switched to the unidirectional transmission mode in which a torque can be transmitted in the forward direction. Note that the second pin member 140*b* is brought into a state where the second pin member 140*b* is spaced apart from the other guide groove portion 160*b*.

On the other hand, when the movable cage 150 is caused to move toward the one end side in the axis direction (the right side in FIG. 14), the movable cage 150 is caused to relatively move in the backward direction with respect to the fixed cage 130 by the second pin member 140*b* being caused to move along the first continuously provided portion 166 in the other guide groove portion 160*b*, and the cams 180 are thus caused to lean. Once the movable cage 150 is fixed at a position in the axis direction where the second pin member 140*b* is located in the first phase change allowing portion 164 in the other guide groove portion 160*b* with respect to the fixed cage 130, a state where a change in phase of the pocket portions 153 in the movable cage 150 in the backward direction with respect to the pocket portions 133 in the fixed cage 130 is allowed is held. In this manner, the operation mode of the cam clutch 100 is switched to the unidirectional transmission mode in which a torque can be transmitted in the backward direction. Note that the first pin member 140*a* is brought into a state where the first pin member 140*a* is spaced part from the one guide groove portion 160*a*.

In the movable cage 150, each of the one guide groove portion 160*a* and the other guide groove portion 160*b* includes the second phase change allowing portion 165, and it is thus possible to switch the operation mode from the unidirectional transmission mode in which a torque can be transmitted in the forward direction to the bidirectional simultaneous transmission mode or to switch the operation mode from the unidirectional transmission mode in which a torque can be transmitted in the backward direction to the bidirectional simultaneous transmission mode in a smooth manner.

Moreover, it is also possible to realize the cam clutch that is compatible with the four operation modes by configuring each guide groove portion to further include a third phase change allowing portion configured to be able to hold the movable cage 150 in a state where the movable cage 150 is movable within a predetermined range in a direction opposite to the moving direction of the movable cage 150 when the pin member 140 is located in the first phase change allowing portion 164.

Figure 15A:
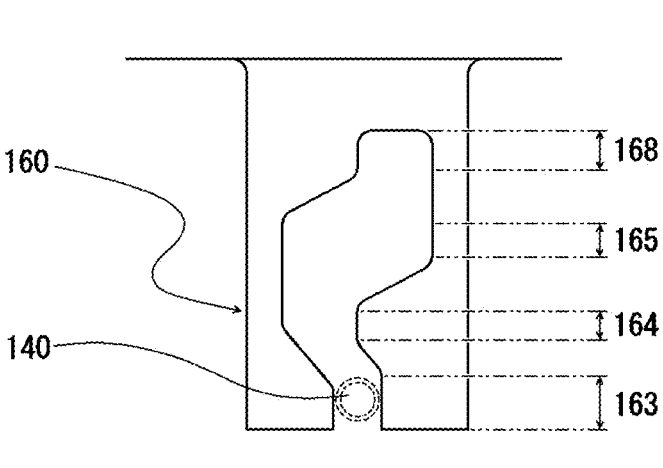
FIG. 15A is a diagram schematically illustrating a configuration of the guide groove portion in yet another configuration example of the movable cage.
Figure 15B:
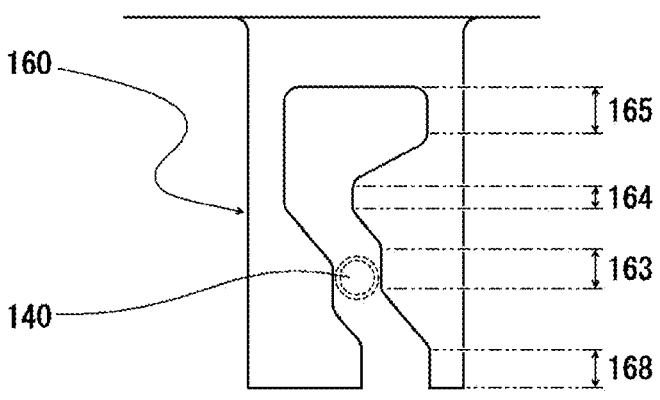
FIG. 15B is a diagram schematically illustrating a configuration of the guide groove portion in yet another configuration example of the movable cage.
Figure 16:
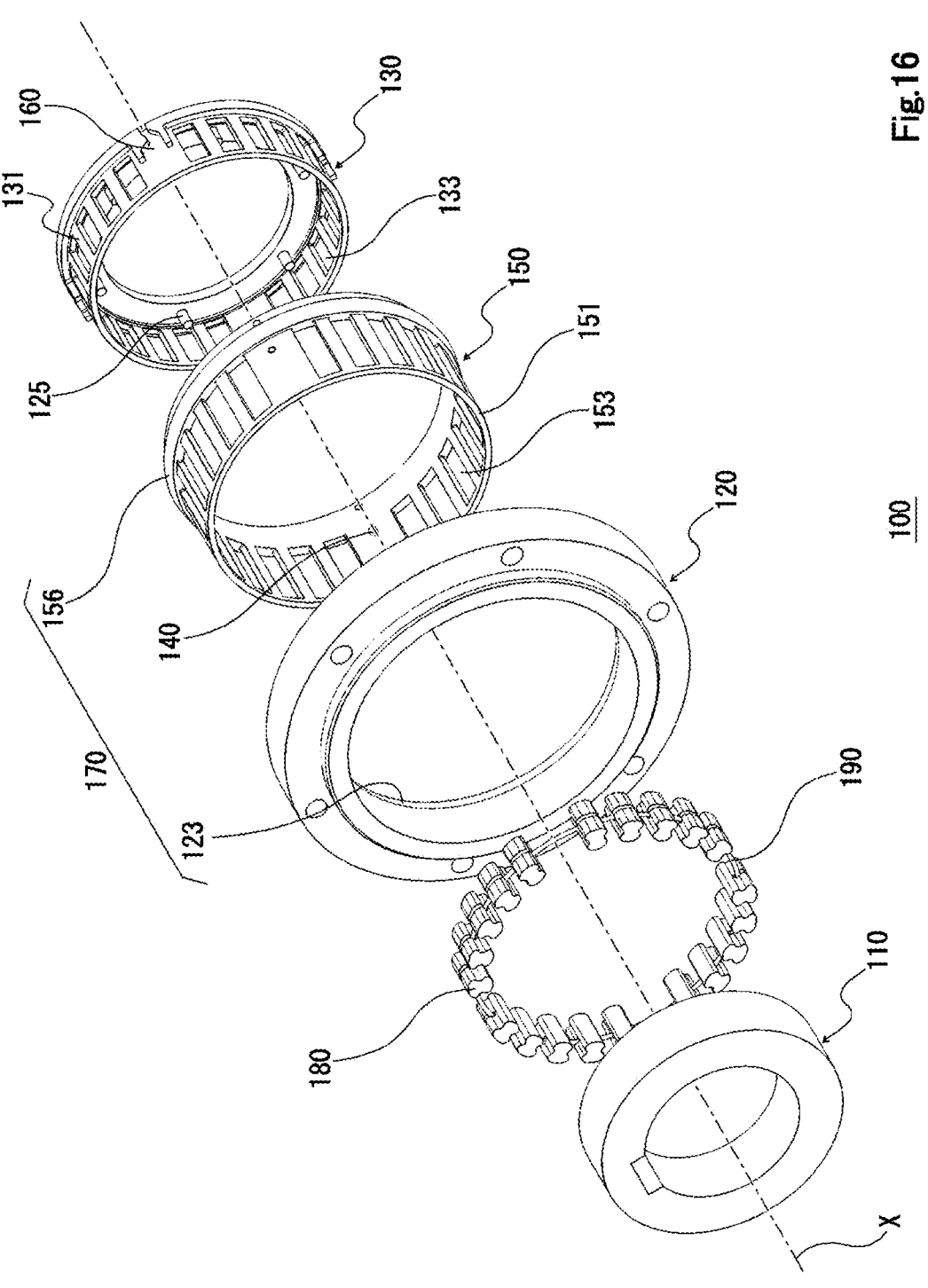
FIG. 16 is an exploded perspective view illustrating a configuration of a cam clutch according to a second embodiment of the present invention.

The third phase change allowing portion 168 may have either a configuration in which the third phase change allowing portion 168 is formed to be continuous with the one end side of the second phase change allowing portion 165 as illustrated in FIG. 15A, for example, or a configuration in which the third phase change allowing portion 168 is formed to be continuous with the other end side of the phase regulating portion 163 as illustrated in FIG. 15B, for example.

Although the embodiment in which the phase synchronization means is configured of a magnet that magnetically integrally bonds the movable cage to the inner ring has been described hitherto, it is only necessary for the phase synchronization means to be configured to be able to cause the movable cage to rotate in synchronization with the inner ring or the outer ring. Hereinafter, a cam clutch according to a second embodiment in which a phase synchronization means is configured to mechanically integrally bond a movable cage to an inner ring or an outer ring will be described.

Second Embodiment

As illustrated in FIGS. 16 to 19, a cam clutch 100 according to the second embodiment basically has the same configuration as that of the cam clutch 100 according to the first embodiment, and includes an inner ring 110, an outer ring 120, a fixed cage 130, a movable cage 150, and cams 180 as engagement elements, and a biasing means 190.

In the present embodiment, the inner ring 110 is configured as a rotation ring on an output side, and the outer ring 120 is configured as a rotation ring on an input side, for example.

Figure 20:
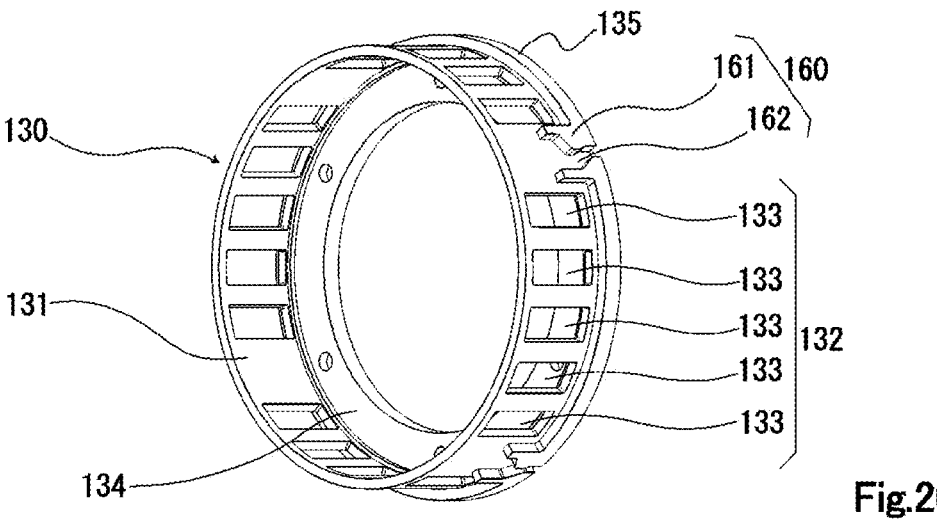
FIG. 20 is a perspective view illustrating a configuration of a fixed cage.

The fixed cage 130 includes a cylindrical shaft portion 131 extending along a rotation axis center with a plurality of pocket portions 133 formed to be aligned at predetermined intervals in the circumferential direction, an annular plate-shaped end wall portion 134 formed to face one end surface of the inner ring 110 at one end of the shaft portion 131, and an outer flange portion 135 extending to project outward in the radial direction over the entire periphery in the circumferential direction at the one end of the shaft portion 131 as illustrated in FIG. 20. In the present embodiment, a plurality of pocket portion groups 132 are arranged to be aligned at equal intervals in the circumferential direction with five pocket portions 133 aligned at equal intervals in the circumferential direction regarded as forming one pocket portion group 132.

Figures 17, 18:
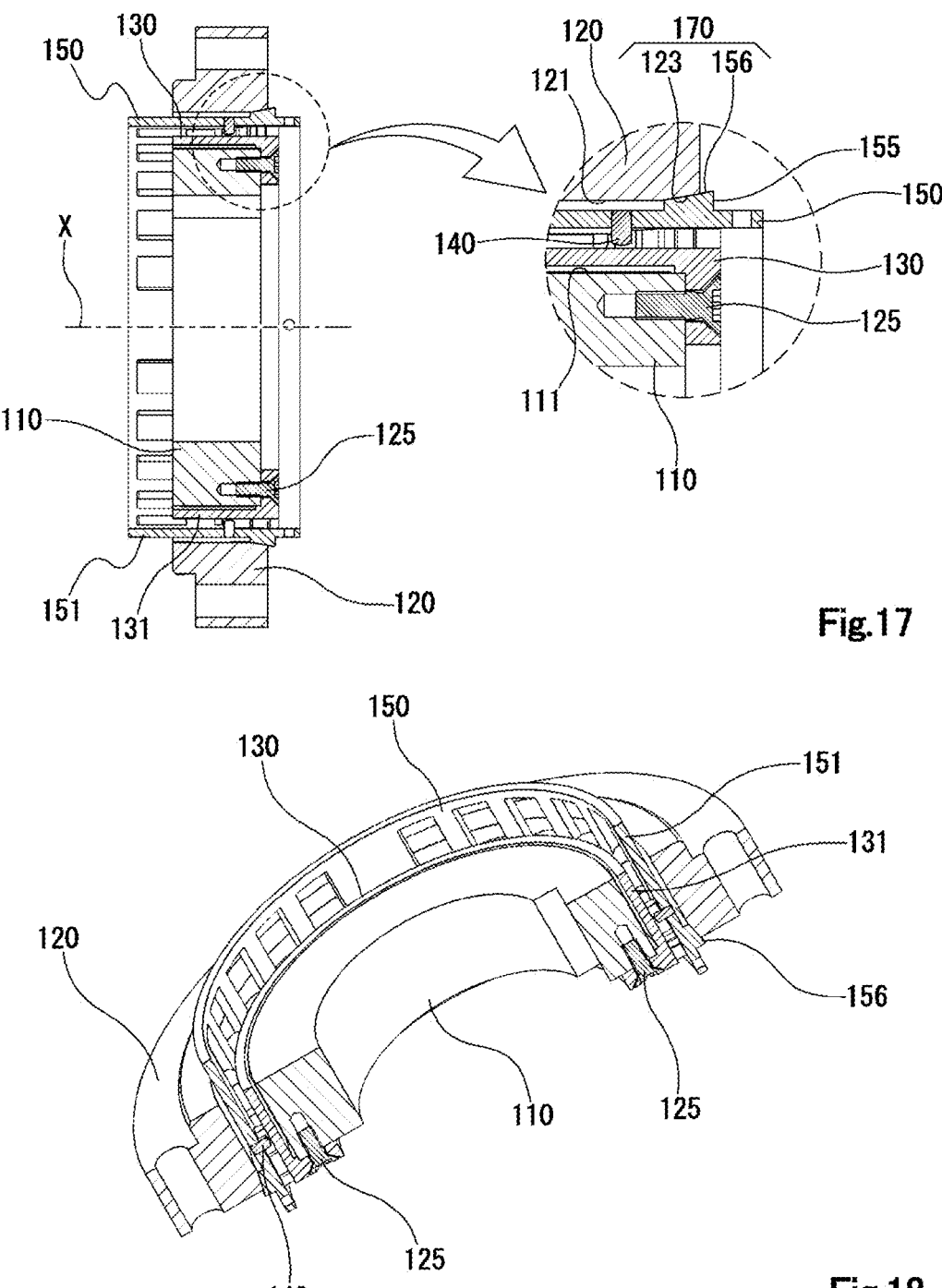
FIG. 17 is a sectional perspective view of the cam clutch illustrated in FIG. 16 when taken along a plane including a rotation axis center.
FIG. 18 is an axis direction sectional view of the cam clutch illustrated in FIG. 16 when taken along a plane including the rotation axis center.

As illustrated in FIGS. 17 and 18, the fixed cage 130 is inserted into and disposed in an annular space between the inner ring 110 and the outer ring 120 such that the shaft portion 131 is located coaxially with the inner ring 110 and the outer ring 120 with a clearance left from a raceway surface 111 of the inner ring 110, and is fixed to the inner ring 110 as the rotation ring on the output side with fixing screws 125 attached from the outward side in the axis direction.

Figure 21:
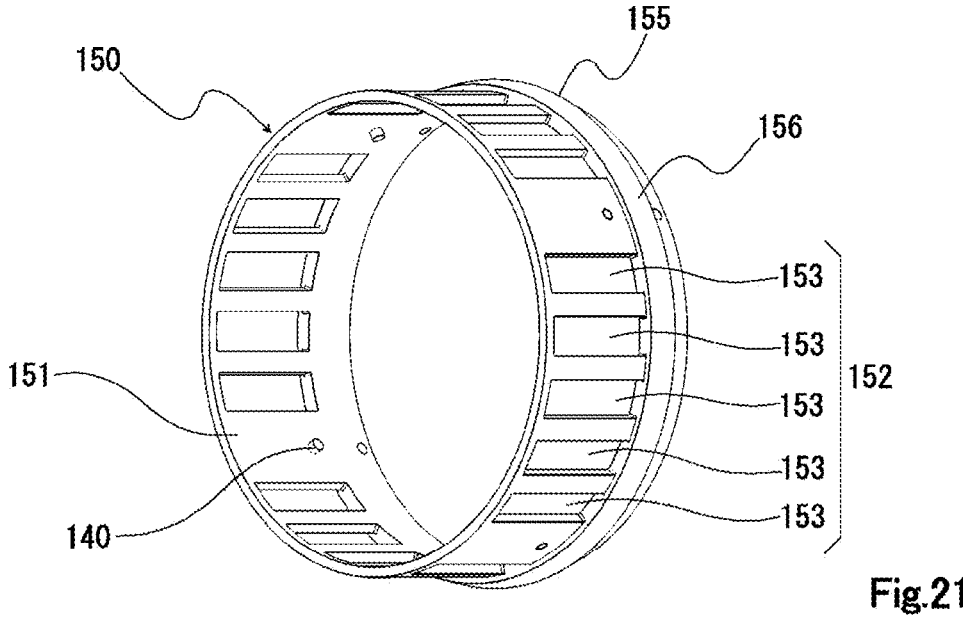
FIG. 21 is a perspective view illustrating a configuration of a movable cage.

As illustrated in FIG. 21, the movable cage 150 includes a cylindrical shaft portion 151 extending along the rotation axis center with a plurality of pocket portions 153 corresponding to the pocket portions 133 in the fixed cage 130, respectively, aligned at predetermined intervals in the circumferential direction and an outer flange portion 155 extending to project outward in the radial direction over the outer periphery in the circumferential direction at one end of the shaft portion 151. In the present embodiment, a plurality of pocket portion groups 152 are arranged to be aligned at equal intervals in the circumferential direction with five pocket portions 153 aligned at equal intervals in the circumferential direction regarded as forming one pocket portion group 152. Each pocket portion 153 is formed such that an opening shape is a rectangular shape.

The movable cage 150 is inserted into the annular space between the inner ring 110 and the outer ring 120 such that the shaft portion 151 is located coaxially with the inner ring 110 and the outer ring 120 with a clearance left from the raceway surface 121 of the outer ring 120 on the outward side of the fixed cage 130, and is disposed to be relatively rotatable with respect to the fixed cage 130 and movable in the axis direction as illustrated in FIGS. 17 and 18.

Figure 22:
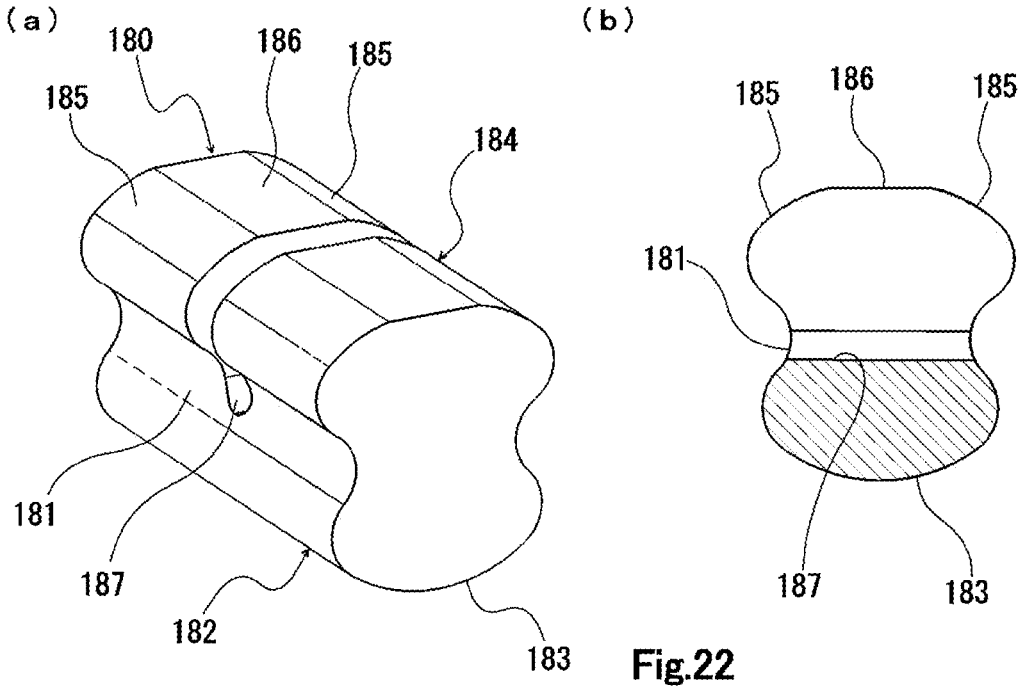
FIG. 22 is (a) a perspective view and (b) a sectional view illustrating a configuration of a cam.

In the present embodiment, each cam 180 includes a garter spring attachment groove 187 at a head part 184 as illustrated in FIG. 22. The garter spring attachment groove 187 is formed such that a bottom surface extends in parallel to a flat surface 186 and is configured such that the cam 180 is biased toward the inner ring 110 by a garter spring as the biasing means 190 being attached in a compressed state. Therefore, the cams 180 are in a state where the cams 180 are not in contact with the outer ring 120 in a neutral posture.

In the present embodiment, guide groove portions 160 are provided in a one end-side region in an outer surface of the shaft portion 131 of the fixed cage 130, and pin members 140 that are caused to move along the guide groove portions 160 by movement of the movable cage 150 in the axis direction are provided in the movable cage 150.

As illustrated in FIG. 20, the guide groove portions 160 are configured by guide grooves 162 that extends in the axis direction being formed in an outer surface of a mounting portion 161 provided to project from the outer surface of the shaft portion 131 of the fixed cage 130. Each guide groove 162 includes a phase regulating portion 163 formed to linearly extend in the axis direction from one end edge of the fixed cage 130 in the axis direction, a first phase change allowing portion 164 that is continuous with the phase regulating portion 163 via a first continuously provided portion 166 extending to be inclined in the forward direction toward the other end side in the axis direction, and a second phase change allowing portion 165 that is continuous with the first phase change allowing portion 164 via a second continuously provided portion 167 configured to have a wider groove width toward the other end side in the axis direction.

When the pin members 140 are located in the phase regulating portions 163, relative rotation of the movable cage 150 in both the forward and backward directions with respect to the fixed cage 130 is inhibited, and the cams 180 are held in the neutral posture. In this manner, the operation mode of the cam clutch 100 is held in a bidirectional simultaneous idling mode.

When the pin members 140 are located in the first phase change allowing portions 164, the cams 180 are caused to lean by the movable cage 150 being made to relatively move in the forward direction with respect to the fixed cage 130, and a change in phase of the pocket portions 153 in the movable cage 150 with respect to the pocket portions 133 in the fixed cage 130 due to the relative rotation of the movable cage 150 with respect to the fixed cage 130 is allowed. In this manner, the cams 180 are held in an interlocking standby state such that interlocking with the inner ring 110 and the outer ring 120 is immediately started by the outer ring 110 being caused to rotate in the forward direction, for example, and the operation mode of the cam clutch 100 is held in the unidirectional transmission mode in which the cams 180 can transmit a torque in the forward direction.

When the pin members 140 are located in the second phase change allowing portions 165, a change in phase of the pocket portions 153 in the movable cage 150 in both the forward and backward directions with respect to the pocket portions 133 in the fixed cage 130 due to relative rotation of the movable cage 150 with respect to the fixed cage 130 is allowed. In this manner, the cams 180 are held in the interlocking standby state such that interlocking with the inner ring 110 and the outer ring 120 is started irrespective of the outer ring 120 being caused to rotate in either of the forward or backward direction, and the operation mode of the cam clutch 100 is held in a bidirectional simultaneous transmission mode in which the cam 180 can transmit a torque in either of the forward or backward direction.

Figure 19:
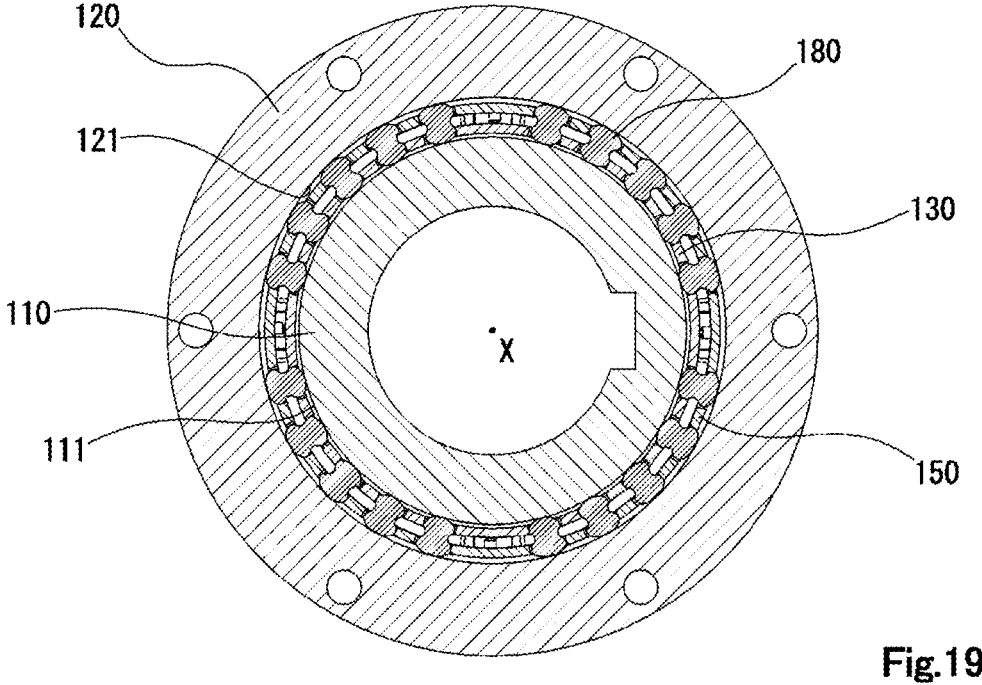
FIG. 19 is a radial direction sectional view of the cam clutch illustrated in FIG. 16 when taken along a plane perpendicularly intersecting the rotation axis center.

Note that in the second embodiment, the counterclockwise direction in FIG. 19 will be referred to as a "forward direction" and the clockwise direction will be referred to as a "backward direction" for convenience.

The pin members 140 are provided to project inward in the radial direction such that distal end portions are inserted into the guide groove portions 160 in the one end-side region between adjacent pocket portion groups 152 in the shaft portion 151 of the movable cage 150.

In the present embodiment, the phase synchronization means 170 is configured to mechanically integrally bond the movable cage 150 to the outer ring 120 and to cause the movable cage 150 to rotate in synchronization with the outer ring 120 when the movable cage 150 is caused to move on the other end side in the axis direction such that the pin members 140 are located in the second phase change allowing portions 165.

The phase synchronization means 170 is configured of a chamfered portion 123 in which an inner peripheral edge at one end of the outer ring 120 is formed into a conical shape and a tapered portion 156 provided at a one end-side part of the movable cage 150. The tapered portion 156 of the movable cage 150 is configured by the outer peripheral surface of the outer flange portion 155 being formed to be inclined inward in the radial direction from the one end side toward the other end side in the axis direction.

An inclined surface of the tapered portion 156 with respect to a rotation axis center is formed to have a larger inclination angle than an inclination angle of an inclined surface of the chamfered portion 123 of the outer ring 120 with respect to the rotation axis center.

Figures 23, 24A:
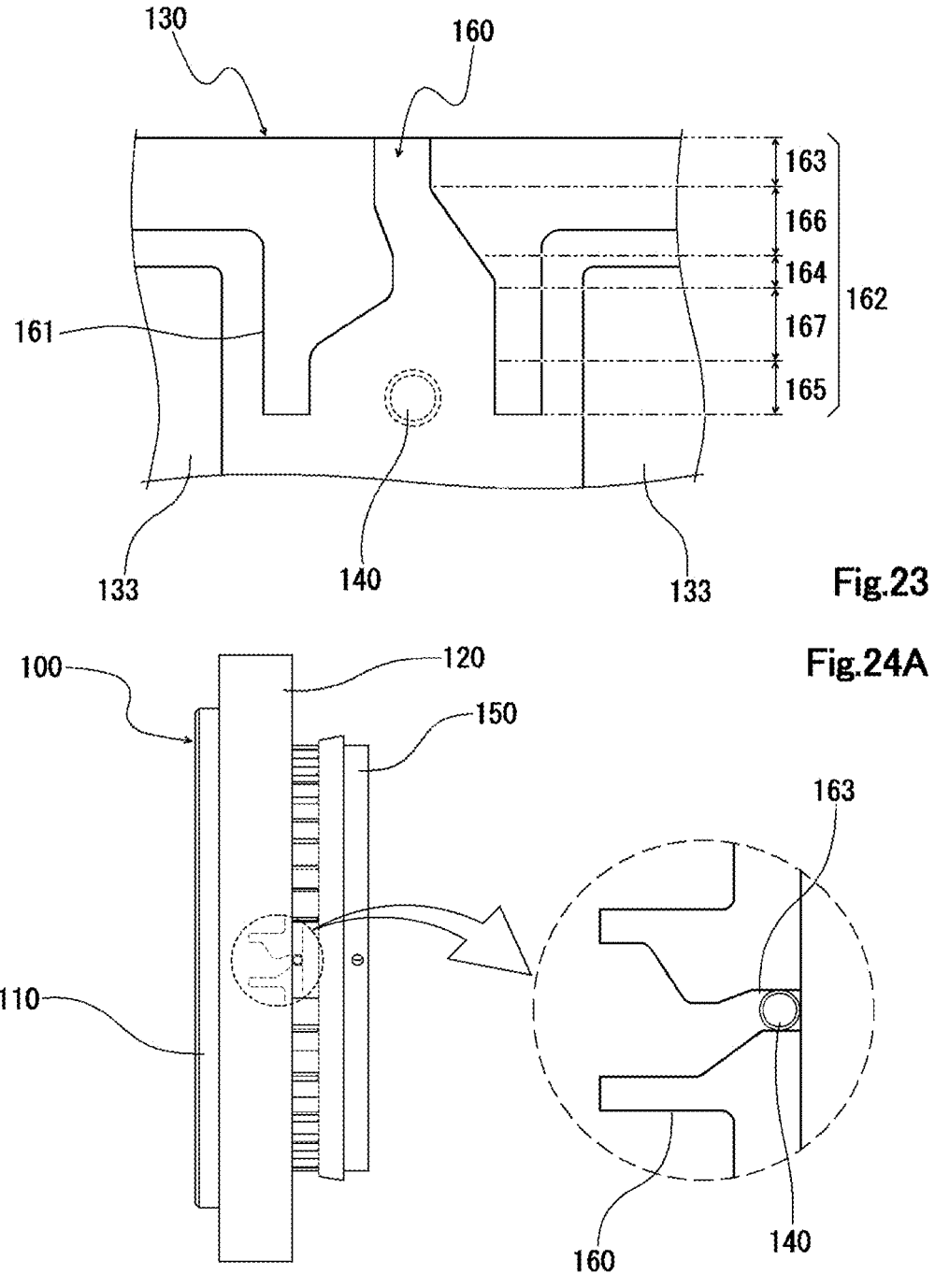
FIG. 23 is a diagram schematically illustrating a configuration of a guide groove portion in the fixed cage.
FIG. 24A is a side view illustrating a state of the cam clutch illustrated in FIG. 16 when an operation mode of the cam clutch is a bidirectional simultaneous idling mode.
Figures 24B, 25A:
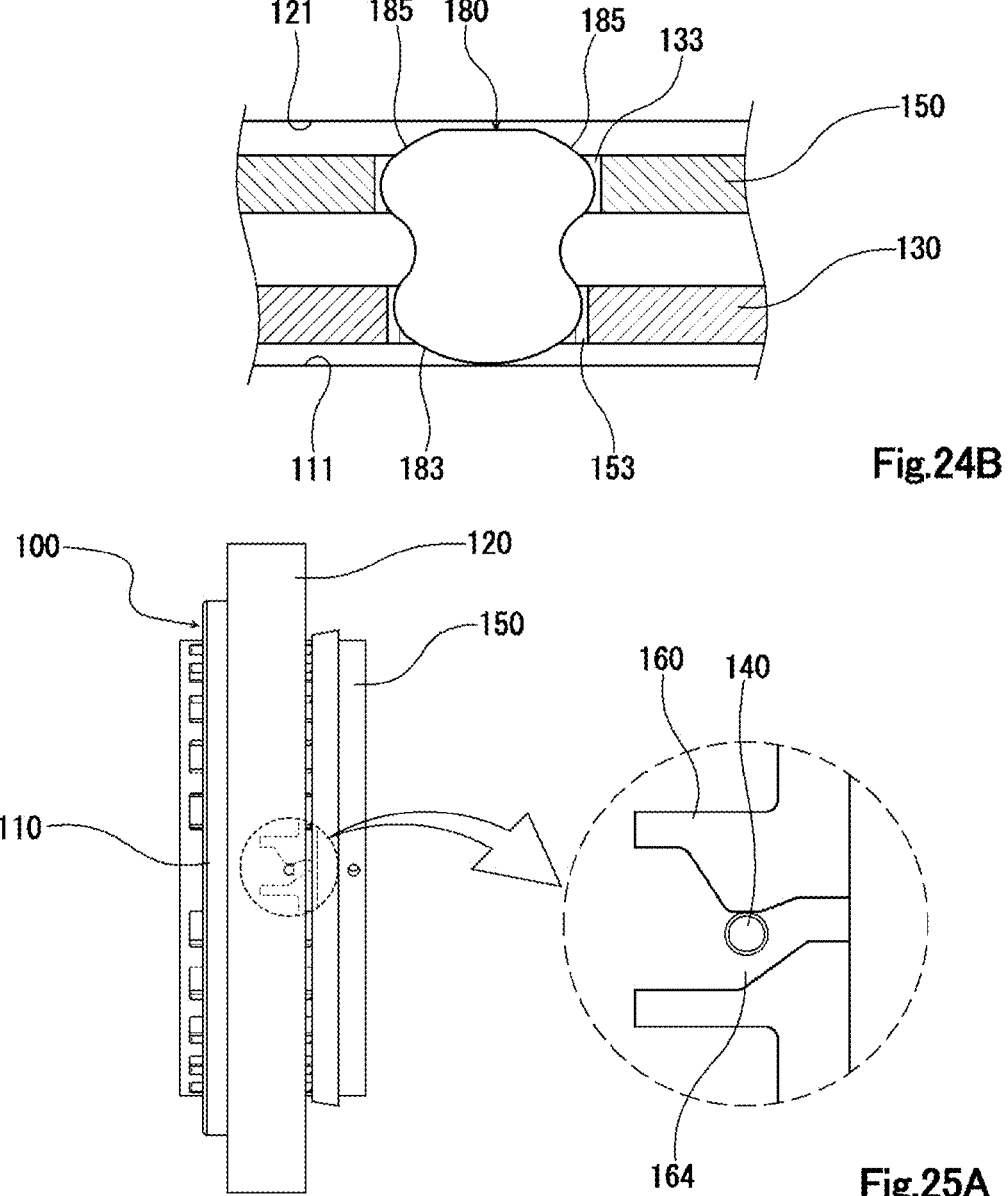
FIG. 24B is a schematic diagram schematically illustrating a state of the cam when the operation mode of the cam clutch illustrated in FIG. 16 is the bidirectional simultaneous idling mode.
FIG. 25A is a side view illustrating a state of the cam clutch illustrated in FIG. 16 when the operation mode of the cam clutch is a unidirectional transmission mode.

In the cam clutch 100 according to the second embodiment, relative movement of the movable cage 150 in both the forward and backward directions with respect to the fixed cage 130 is inhibited, and the pocket portions 153 in the movable cage 150 are held in the same phase as that of the pocket portions 133 in the fixed cage 130, when the movable cage 150 is fixed at a position in the axis direction where the pin members 140 are located in the phase regulating portions 163 in the guide groove portion 160 with respect to the fixed cage 130 as illustrated in FIG. 24A. In this state, all the cams 180 are maintained in a state where the cams 180 are separated from the raceway surface 121 of the outer ring 120 as illustrated in FIG. 24B. Therefore, the operation mode of the cam clutch 100 is a bidirectional simultaneous idling mode in which torque transmission between the inner ring 110 and the outer ring 120 is blocked.

Figures 25B, 26A:
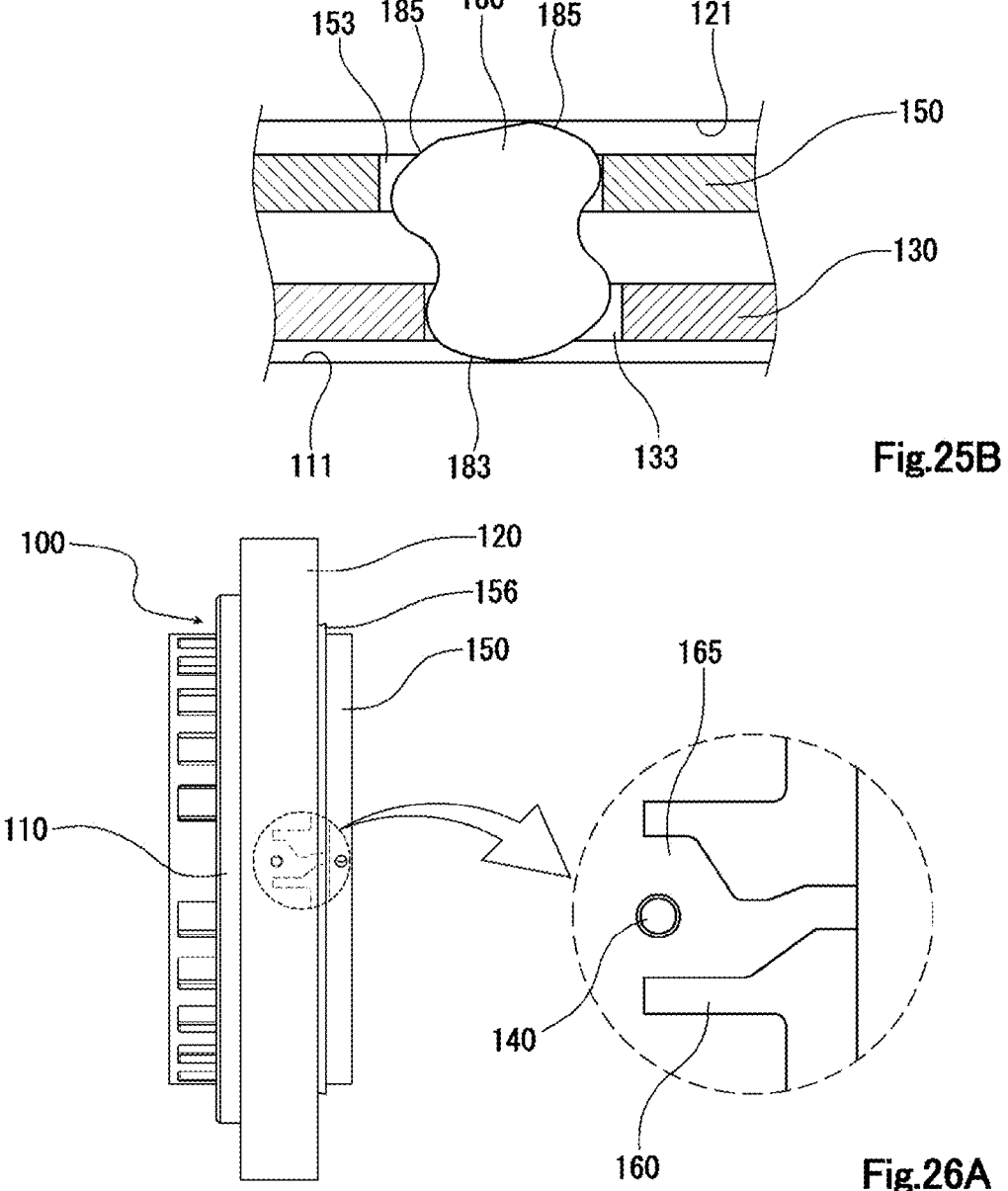
FIG. 25B is a schematic view illustrating a state of the cam when the operation mode of the cam clutch illustrated in FIG. 16 is the unidirectional transmission mode.
FIG. 26A is a side view illustrating a state of the cam clutch illustrated in FIG. 16 when the operation mode of the cam clutch is a bidirectional simultaneous transmission mode.

Once the movable cage 150 is caused to move on the other end side in the axis direction and are fixed at a position in the axis direction where the pin members 140 are located in the first phase change allowing portions 164 in the guide groove portions 160 as illustrated in FIG. 25A, a state where a change in phase of the pocket portions 153 in the movable cage 150 in the forward direction with respect to the pocket portions 133 in the fixed cage 130 is allowed is held. The cams 180 are caused to lean in the interlocking direction toward the forward direction as illustrated in FIG. 25B. Therefore, the operation mode of the cam clutch 100 is switched to the unidirectional transmission mode in which a torque can be transmitted in the forward direction.

Once the movable cage 150 is caused to further move on the other end side in the axis direction and is fixed at a position in the axis direction where the pin members 140 are located in the second phase change allowing portions 165 in the guide groove portions 160 as illustrated in FIG. 26A, a state where relative movement of the movable cage 150 in both the forward and backward directions with respect to the fixed cage 130 is allowed is held. At this time, the tapered portion 156 of the movable cage 150 is brought into contact engagement with the chamfered portion 123 of the outer ring 120, and the movable cage 150 and the outer ring 120 are mechanically integrally bonded.

Figures 26B, 26C:
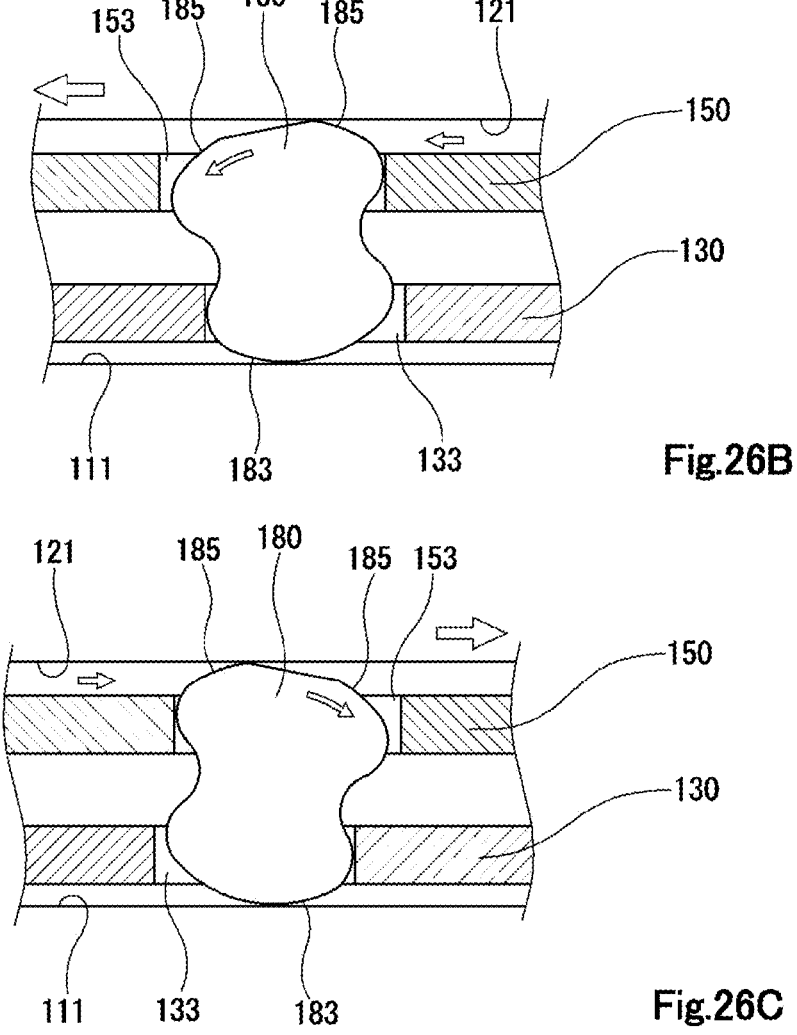
FIG. 26B is a schematic diagram schematically illustrating a behavior of the cam when the operation mode of the cam clutch illustrated in FIG. 16 is the bidirectional simultaneous transmission mode.
FIG. 26C is a schematic diagram schematically illustrating a behavior of the cam when the operation mode of the cam clutch illustrated in FIG. 1 is the bidirectional simultaneous transmission mode.

Once the outer ring 120 rotates in the forward direction in this state, the movable cage 150 rotates integrally with the outer ring 120 and pressurizes the head parts 184 of the cams 180 as illustrated in FIG. 26B. In this manner, the cams 180 lean in the interlocking direction toward the forward direction and are engaged with the inner ring 110 and the outer ring 120, and torque transmission in the forward direction is performed. On the other hand, once the outer ring 120 rotates in the backward direction, the movable cage 150 rotates integrally with the outer ring 120 and pressurizes the head parts 184 of the cams 180 as illustrated in FIG. 26C. In this manner, the cams 180 lean in the interlocking direction toward the backward direction and are engaged with the inner ring 110 and the outer ring 120, and torque transmission in the backward direction is performed. In this manner, it is possible to cause the cams 180 to actively lean in accordance with the rotating direction of the outer ring 120 as the rotation ring on the input side by achieving a state where the pin members 140 are located in the second phase change allowing portions 165 in the guide groove portions 160, and the operation mode of the cam clutch 100 is switched to the bidirectional simultaneous transmission mode in which a torque can be transmitted in both the forward and backward directions.

Therefore, according to the cam clutch 100 of the aforementioned second embodiment, effects similar to those of the cam clutch 100 according to the first embodiment are basically obtained. Moreover, it is possible to avoid occurrence of slipping of bonding surfaces between the movable cage 150 and the outer ring 120 due to a change in posture of the cams 180 and to avoid instability of the operation mode due to adsorption of wear debris, for example, by the phase synchronization means 170 being configured to mechanically integrally bond the movable cage 150 to the outer ring 120.

Although the aforementioned cam clutch 100 according to the first embodiment and cam clutch 100 according to the second embodiment have been described as having a configuration in which the cams 180 are brought into a neutral posture by being biased by the biasing means 190, the cams 180 may be configured to be brought into an inclined posture in which the cams 180 are in contact with the inner ring 110 and the outer ring 120 by being biased by the biasing means 190.

Figures 27, 28A:
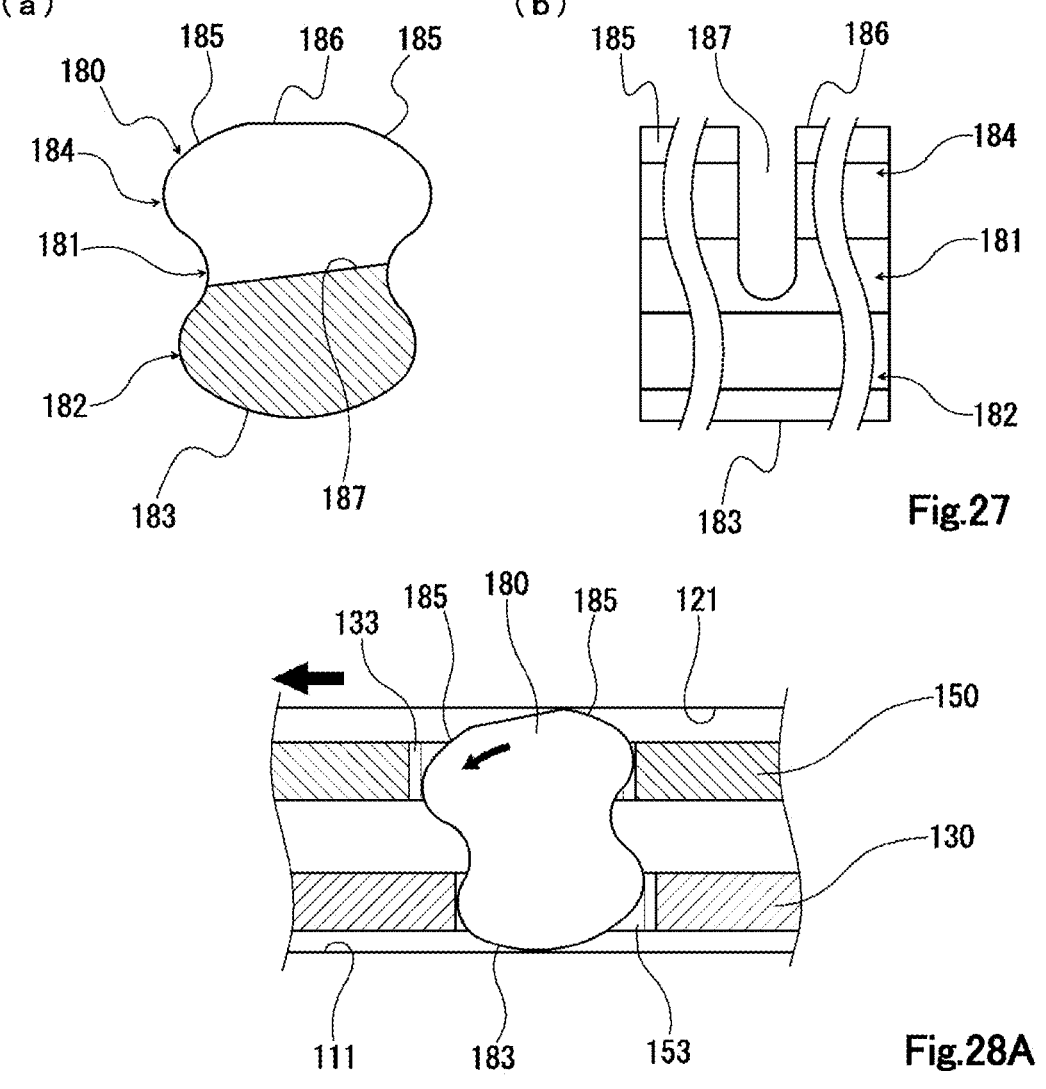
FIG. 27 is (a) a perspective view and (b) a sectional view illustrating another configuration example of the cam.
FIG. 28A is a schematic diagram schematically illustrating a behavior of the cam when the operation mode of the cam clutch is the unidirectional transmission mode.

In each of such cams 180, a garter spring attachment groove 187 is formed such that the bottom surface thereof extends to be inclined outward in the radial direction from one side to the other side as illustrated in FIG. 27, for example, and the cam 180 is biased into an inclined posture in which an inner ring-side engagement surface 183 of the cam 180 and one outer ring-side engagement surface 185 are in contact with the inner ring 110 and the outer ring 120 by a garter spring as the biasing means 190 being attached. Although the configuration in which the garter spring attachment groove 187 is formed at the head part 184 is adopted in this example, a configuration in which the garter spring attachment groove 187 is formed at a leg part 182 may also be adopted. Also, the garter spring attachment groove 187 may be formed such that the cams 180 are brought into an inclined posture in which a torque can be transmitted in the forward direction or may be formed such that the cams 180 are brought into an inclined posture in which a torque can be transmitted in the backward direction.

In the cam clutch using such cams 180, the cams 180 brought into a state where the neutral posture is held by being fixed at a position in the axis direction where the pin members 140 are located in the phase regulating portions 163 in the guide groove portions 160 when the operation mode is the bidirectional simultaneous idling mode (see FIG. 24B).

When the operation mode of the cam clutch is set to the unidirectional transmission mode, the state where the movable cage 150 is fixed at a position in the axis direction where the pin members 140 are located in the first phase change allowing portions 164 in the guide groove portions 160 and a change in phase of the movable cage 150 in the forward direction with respect to the fixed cage 130 is allowed is held, and the cams 180 are biased by the biasing means and are held in the leaning posture in which the cams 180 have rotated in the interlocking direction toward the forward direction as illustrated in FIG. 28A. Therefore, it is possible to improve followability of the leaning operation of the cams 180 in the interlocking direction accompanying the rotation of the outer ring 120 in the forward direction as illustrated by the solid arrows in FIG. 28A.

Figures 28B, 29:
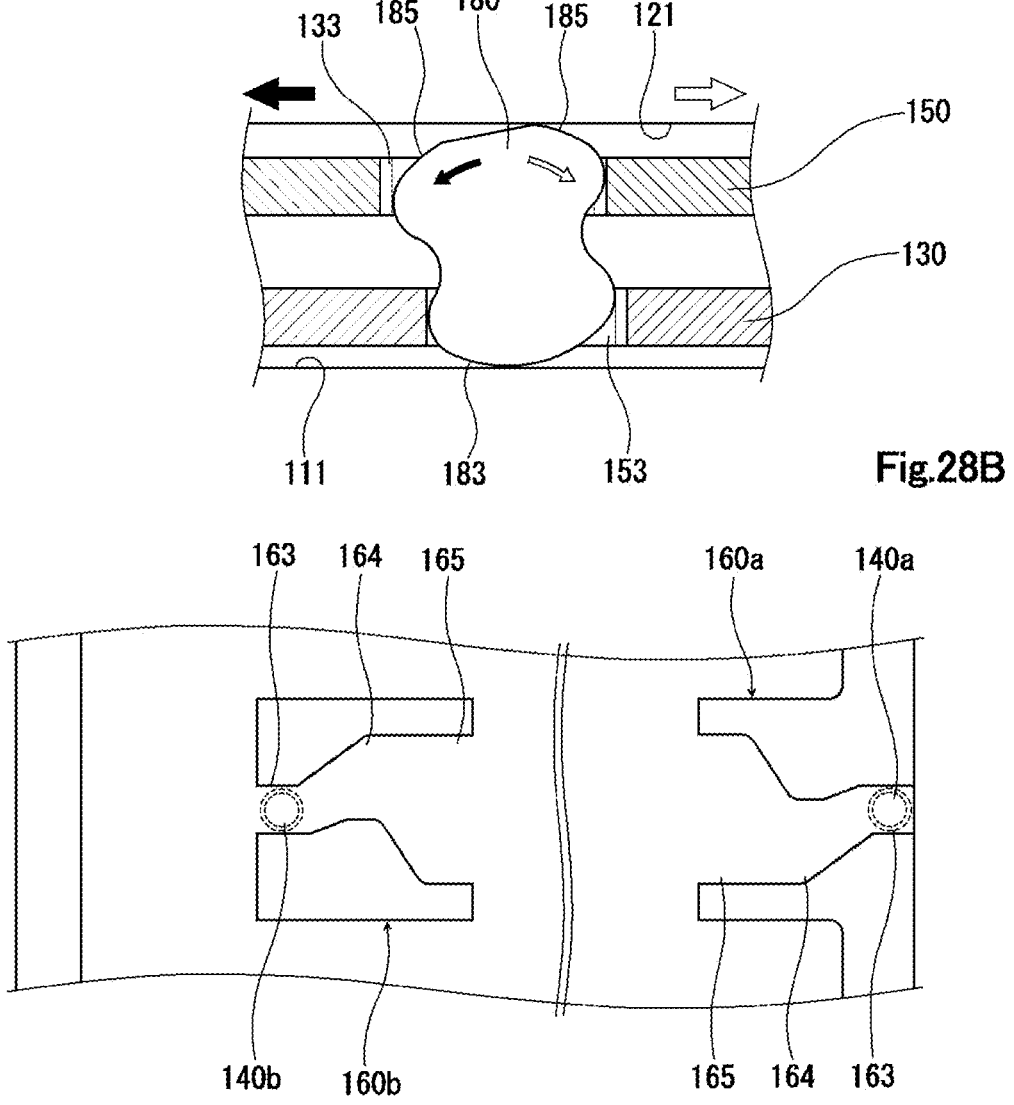
FIG. 28B is a schematic diagram schematically illustrating a behavior of the cam when the operation mode of the cam clutch is the bidirectional simultaneous transmission mode.
FIG. 29 is a diagram schematically illustrating a configuration of a guide groove in another configuration example of the fixed cage.

Also, when the operation mode of the cam clutch is set to the bidirectional simultaneous transmission mode, a state where the movable cage 150 is fixed at a position in the axis direction where the pin members 140 are located on the second phase change allowing portions 165 in the guide groove portions 160 and relative movement of the movable cage 150 in both the forward and backward direction with respect to the fixed cage 130 is allowed is held, and the cams 180 are biased by the biasing means and are held in the leaning posture in which the cams 180 have rotated in the interlocking direction toward the backward direction as illustrated in FIG. 28B.

At this time, the movable cage 150 and the outer ring 120 are integrally bonded, and the cams 180 thus lean in the interlocking direction and are engaged with the inner ring 110 and the outer ring 120 with rotation of the outer ring 120 in the forward direction as illustrated by the solid arrows in FIG. 28B. Also, the cams 180 lean in the interlocking direction and are engaged with the inner ring 110 and the outer ring 120 with rotation of the outer ring 120 in the backward direction as illustrated by the outlined arrow in FIG. 28B.

It is also possible to configure the cam clutch according to the second embodiment to be able to switch the operation mode among the four operation modes.

The cam clutch that is compatible with the four operation modes can be realized by using the fixed cage 130 configured such that the guide groove portions are provided in each of a one end-side region and the other end-side region in the outer surface of the shaft portion 131, the first phase change allowing portion 164 in one guide groove portion 160a and the first phase change allowing portion 164 in the other guide groove portion 160b hold the movable cage 150 within a predetermined range in mutually different directions with respect to the fixed cage 130 as illustrated in FIG. 29, for example. In a case where such a fixed cage 130 is used, the movable cage is configured such that the first pin member 140a and the second pin member 140b are provided in the one end-side region and the other end-side region, respectively in the inner surface of the shaft portion.

In the cam clutch including such a fixed cage 130, the first pin member 140a and the second pin member 140b are in a state where the first pin member 140a and the second pin member 140b are located in the phase regulating portion 163 in the one guide groove portion 160a and the phase regulating portion 163 in the other guide groove portion 160*b*, respectively, when the operation mode is the bidirectional simultaneous idling mode.

Once the movable cage is caused to move toward the other end side in the axis direction (the left side in FIG. 29), and the movable cage is fixed at a position in the axis direction where the first pin member 140*a* is located in the first phase change allowing portion 164 in the one guide groove portion 160*a* with respect to the fixed cage 130, a state where a change in phase of the pocket portions in the movable cage in the forward direction with respect to the pocket portions in the fixed cage is held. In this manner, the operation mode of the cam clutch 100 is switched to the unidirectional transmission mode in which a torque can be transmitted in the forward direction. Note that the second pin member 140*b* is brought into a state where the second pin member 140*b* is spaced apart from the other guide groove portion 160*b*.

On the other hand, once the movable cage is caused to move toward the one end side in the axis direction (the right side in FIG. 29), and the movable cage is fixed at a position in the axis direction where the second pin member 140*b* is located in the first phase change allowing portion 164 in the other guide groove portion 160*b* with respect to the fixed cage 130, a state where a change in phase of the pocket portions in the movable cage in the backward direction with respect to the pocket portions in the fixed cage is held. In this manner, the operation mode of the cam clutch 100 is switched to the unidirectional transmission mode in which a torque can be transmitted in the backward direction. Note that the first pin member 140*a* is brought into a state where the first pin member 140*a* is spaced part from the one guide groove portion 160*a*.

In the fixed cage 130, each of the one guide groove portion 160*a* and the other guide groove portion 160*b* includes the second phase change allowing portion 165, and it is possible to switch the operation mode from the unidirectional transmission mode in which a torque can be transmitted in the forward direction to the bidirectional simultaneous transmission mode or to switch the operation mode from the unidirectional transmission mode in which a torque can be transmitted in the backward direction to the bidirectional simultaneous transmission mode in a smooth manner.

In this case, it is possible to cause the movable cage to rotate in synchronization with the outer ring when the second pin member 140*b* is located in the second phase change allowing portion 165 and the operation mode is set to the bidirectional simultaneous transmission mode by forming the chamfered portion in the outer ring and providing the tapered portion in the movable cage even on the other end side in the axis direction.

Moreover, it is also possible to realize the cam clutch that is compatible with the four operation modes by configuring each guide groove portion to further include a third phase change allowing portion configured to be able to hold the movable cage 150 in a state where the movable cage 150 is movable within a predetermined range in a direction opposite to the moving direction of the movable cage 150 when the pin member 140 is located in the first phase change allowing portion 164.

Figure 30:
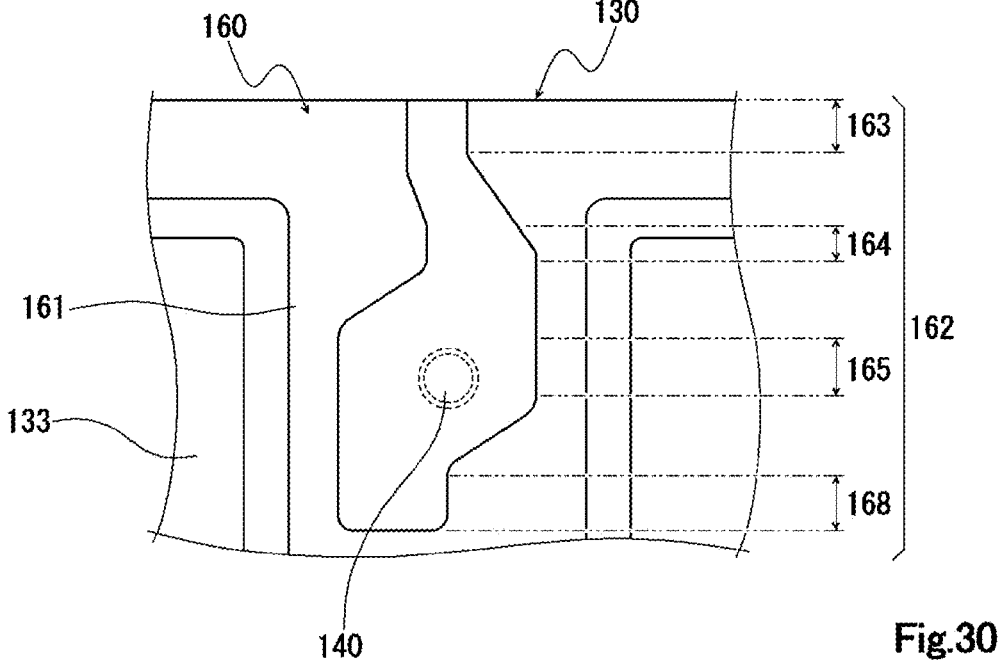
FIG. 30 is a diagram schematically illustrating a configuration of the guide groove in yet another configuration example of the fixed cage.

The third phase change allowing portion 168 can be formed to be continuous with the other end side of the second phase change allowing portion 165 as illustrated in FIG. 30, for example.

Although the embodiments of the present invention have been described in detail hitherto, various changes in design can be made without departing from the invention described in the claims.

For example, although the aforementioned first embodiment has been described by exemplifying the configuration in which the inner ring is the rotation ring on the input side and the outer ring is the rotation ring on the output side, the inner ring may be configured as a rotation ring on the output side, and the outer ring may be configured as a rotation ring on the output side. Therefore, the cams may be configured to be separated from the outer ring in the neutral posture, or the cams may be configured to be separated from the inner ring and the outer ring in the neutral posture. Furthermore, a configuration in which a cage located on the inner ring side is a fixed cage, a cage located on the outer ring side is a movable cage, and a magnet as a phase synchronization means is provided in the cage on the outer ring side may be adopted. Similarly, the inner ring may be configured as a rotation ring on the input side, and the outer ring may be configured as a rotation ring on the output side in the aforementioned second embodiment. Therefore, the cams may be configured to be separated from the inner ring in the neutral posture, or the cams may be configured to be separated from the inner ring and the outer ring in the neutral posture. Furthermore, a cage located on the inner ring side may be a movable cage, a cage located on the outer ring side may be a fixed cage, and the phase synchronization means may be configured such that the movable cage is mechanically integrally bonded to the inner ring.

Also, although the configuration in which the pin members are provided in the fixed cage and the guide groove portions are provided in the movable cage has been described in the aforementioned first embodiment, a configuration in which the guide groove portions are provided in the inner surface of the shaft portion of the fixed cage and the pin members provided to project outward in the radial direction are provided in the outer surface of the movable cage may be adopted. Similarly, a configuration in which the guide groove portions are provided in the inner surface of the movable cage and the pin members provided to project outward in the radial direction are provided in the outer surface of the fixed cage may be adopted in the aforementioned second embodiment.

Moreover, the phase synchronization means may be configured of a friction plate or a spring, for example, as long as it is configured to be able to cause the movable cage to rotate in synchronization with the inner ring or the outer ring.

Furthermore, it is not necessary to configure the cams to have a horizontally symmetrical shape as long as it is configured to be possible to establish interlocking in either of the forward or backward direction.

Furthermore, alignment of the pocket portions in the fixed cage and the movable cage is not limited to those in the aforementioned embodiments and can be appropriately changed in accordance with the number of cams (torque capacity) to be mounted.

Moreover, the biasing means is not particularly limited as long as it is an elastic element that biases each of the plurality of cams toward the outer ring and may be configured of a plurality of plate springs, a plurality of torsion springs, or the like.

REFERENCE SIGNS LIST

100 Cam clutch
110 Inner ring

111 Raceway surface
120 Outer ring
121 Raceway surface
123 Chamfered portion
125 Fixing screw
130 Fixed cage
131 Shaft portion
132 Pocket portion group
133 Pocket portion
134 End wall portion
135 Outer flange portion
136 Screw attachment hole
140 Pin member
140*a* First pin member
140*b* Second pin member
150 Movable cage
151 Shaft portion
152 Pocket portion group
153 Pocket portion
154 End wall portion
155 Outer flange portion
156 Tapered portion
160 Guide groove portion
160*a* One guide groove portion
160*b* Other guide groove portion
161 Mounting portion
162 Guide groove
163 Phase regulating portion
164 First phase change allowing portion
165 Second phase change allowing portion
166 First continuously provided portion
167 Second continuously provided portion
168 Third phase change allowing portion
170 Phase synchronization means
180 Cam
181 Narrowed portion
182 Leg part
183 Inner ring-side engagement surface
184 Head part
185 Outer ring-side engagement surface
186 Flat surface
187 Garter spring attachment groove
190 Biasing means

The invention claimed is:

1. A cam clutch comprising:

an inner ring and an outer ring that are coaxially provided such that the inner ring and the outer ring are relatively rotatable;

a fixed cage that includes pocket portions aligned at predetermined intervals in a circumferential direction and is fixed to the inner ring or the outer ring;

a movable cage that includes pocket portions aligned at predetermined intervals in the circumferential direction and is disposed to be relatively rotatable with respect to the fixed cage;

a plurality of cams that are arranged in the circumferential direction between the inner ring and the outer ring by being held by the fixed cage and the movable cage and are configured to be able to be engaged with the inner ring and the outer ring irrespective of the cams leaning in either of a forward or backward direction with respect to a neutral posture in which the cams are not in contact with one of or both the inner ring and the outer ring; and a biasing means for biasing the plurality of cams into the neutral posture or an inclined posture in which the cams are brought into contact with the inner ring and the outer ring, wherein the movable cage is axially movably provided, one of the fixed cage and the movable cage is provided with guide groove portions such that the guide grooves extend in an axis direction, the other one of the fixed cage and the movable cage is provided with pin members such that the pin members move along the guide groove portions with movement of the movable cage in the axis direction, and each of the guide groove portions includes a phase regulating portion that is configured to be able to hold the movable cage in a state where the pocket portions of the movable cage are in the same phase as a phase of the pocket portions of the fixed cage, a first phase change allowing portion that is configured to be able to hold the movable cage in a state where the movable cage is movable within a predetermined range in one of the forward and backward directions with respect to the fixed cage, and a second phase change allowing portion that is configured to be able to hold the movable cage in a state where the movable cage is movable within a predetermined range in both the forward and backward directions with respect to the fixed cage.

2. The cam clutch according to claim 1, wherein each of the guide groove portions is formed such that the first phase change allowing portion is located between the phase regulating portion and the second phase change allowing portion.

3. The cam clutch according to claim 1, wherein the guide groove portions are provided in each of one end-side region and the other end-side region in the axis direction, and the first phase change allowing portion of one of the guide groove portions and the first phase change allowing portion of the other guide groove portion are configured to hold the movable cage such that the movable cage is movable within a predetermined range in mutually different directions with respect to the fixed cage.

4. The cam clutch according to claim 1, wherein each of the guide groove portions further includes a third phase change allowing portion configured to be able to hold the movable cage in a state where the movable cage is movable within a predetermined range in a direction opposite to a moving direction of the movable cage when the pin member is located in the first phase change allowing portion.

5. The cam clutch according to claim 1, wherein the movable cage includes a phase synchronization means for causing the movable cage to rotate in synchronization with the inner ring or the outer ring when the movable cage is caused to move in the axis direction such that each of the pin members is located in the second phase change allowing portion.

6. The cam clutch according to claim 5, wherein the phase synchronization means is configured of a magnet.

7. The cam clutch according to claim 5, wherein the phase synchronization means is provided in the movable cage and is configured of a tapered portion that is able to be brought into contact engagement with the inner ring or the outer ring by being moved in the axis direction.

8. The cam clutch according to claim 1, wherein each of the plurality of cams is configured to rotate on an own rotation axis of the cam and is brought into an inclined posture by being biased by the biasing means.

* * * * *